United States Patent
Tosic et al.

(10) Patent No.: US 10,083,369 B2
(45) Date of Patent: Sep. 25, 2018

(54) ACTIVE VIEW PLANNING BY DEEP LEARNING

(71) Applicants: Ivana Tosic, Cupertino, CA (US); Logan Courtney, Cupertino, CA (US); Noah Bedard, Cupertino, CA (US)

(72) Inventors: Ivana Tosic, Cupertino, CA (US); Logan Courtney, Cupertino, CA (US); Noah Bedard, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/201,089

(22) Filed: Jul. 1, 2016

(65) Prior Publication Data

US 2018/0005079 A1    Jan. 4, 2018

(51) Int. Cl.
| G06K 9/62 | (2006.01) |
|---|---|
| G06N 3/08 | (2006.01) |
| G06N 3/04 | (2006.01) |
| G06K 9/66 | (2006.01) |
| G06T 7/73 | (2017.01) |

(52) U.S. Cl.
CPC ............ G06K 9/6212 (2013.01); G06K 9/66 (2013.01); G06N 3/0472 (2013.01); G06N 3/08 (2013.01); G06T 7/73 (2017.01); *G06T 2207/20076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 6,119,065 A | 9/2000 | Shimada et al. |
|---|---|---|
| 6,594,622 B2 | 7/2003 | Srivastava |
| 6,731,788 B1 | 5/2004 | Agnihotri et al. |
| 6,748,375 B1 | 6/2004 | Wong et al. |
| 6,925,455 B2 | 8/2005 | Gong et al. |
| 6,977,679 B2 | 12/2005 | Tretter et al. |

(Continued)

FOREIGN PATENT DOCUMENTS

| EP | 869466 | 7/2003 |
|---|---|---|
| EP | 2987106 | 2/2016 |

(Continued)

OTHER PUBLICATIONS

Johns, Edward, Stefan Leutenegger, and Andrew J. Davison. "Pairwise decomposition of image sequences for active multi-view recognition." Proceedings of the IEEE Conference on Computer Vision and Pattern Recognition. 2016. 10 pages.*

(Continued)

*Primary Examiner* — Ryan P Potts
(74) *Attorney, Agent, or Firm* — Patent Law Works LLP

(57) ABSTRACT

A system and method that identifies an object and a viewpoint from an image with a probability that satisfies a predefined criterion is described. An active view planning application receives a first image, performs recognition on the first image to determine an object, a viewpoint and a probability of recognition, determines a first expected gain in the probability of recognition when a first action is taken and a second expected gain in the probability of recognition when a second action is taken, and identifies a next action from the first action and the second action based on an increase in expected gains.

20 Claims, 13 Drawing Sheets

(56) References Cited

U.S. PATENT DOCUMENTS

| | | | |
|---|---|---|---|
| 7,212,233 | B2 | 5/2007 | Nakamura |
| 7,227,985 | B2 | 6/2007 | Ikeda et al. |
| 7,231,652 | B2 | 6/2007 | Gutta et al. |
| 7,243,085 | B2 | 7/2007 | Hatta |
| 7,337,455 | B2 | 2/2008 | Agnihotri et al. |
| 7,403,640 | B2 | 7/2008 | Zhang et al. |
| 7,499,918 | B2 | 3/2009 | Ogikubo |
| 7,610,546 | B1 | 10/2009 | Nagao et al. |
| 7,668,797 | B2 | 2/2010 | Kuvich |
| 7,765,461 | B2 | 7/2010 | Suzuki et al. |
| 7,784,077 | B2 | 8/2010 | Fernandez |
| 7,805,404 | B2 | 9/2010 | Fernandez |
| 7,805,405 | B2 | 9/2010 | Fernandez |
| 7,904,465 | B2 | 3/2011 | Fernandez |
| 7,904,490 | B2 | 3/2011 | Ogikubo |
| 8,131,750 | B2 | 3/2012 | Bathiche et al. |
| 8,234,634 | B2 | 7/2012 | Coqueret et al. |
| 8,266,064 | B1 | 9/2012 | Kumar |
| 8,386,925 | B2 | 2/2013 | Nagasaka et al. |
| 8,825,682 | B2 | 9/2014 | Kishi et al. |
| 8,909,559 | B1 | 12/2014 | Shah et al. |
| 8,945,008 | B2 | 2/2015 | Takehara et al. |
| 9,152,849 | B2 | 10/2015 | Ganong et al. |
| 9,305,216 | B1 | 4/2016 | Mishra |
| 9,354,778 | B2 | 5/2016 | Cornaby et al. |
| 2004/0022356 | A1* | 2/2004 | Subotic ................ G01V 5/005 378/57 |
| 2006/0048231 | A1 | 3/2006 | Tanida |
| 2006/0161669 | A1 | 7/2006 | Mathew et al. |
| 2007/0016541 | A1 | 1/2007 | Baum |
| 2009/0248596 | A1 | 10/2009 | Matsumoto et al. |
| 2010/0211456 | A1 | 8/2010 | Reed et al. |
| 2010/0262286 | A1* | 10/2010 | Eidenberger .......... G06N 7/005 700/246 |
| 2014/0316235 | A1 | 10/2014 | Davis et al. |
| 2014/0357312 | A1 | 12/2014 | Davis et al. |
| 2014/0378810 | A1 | 12/2014 | Davis et al. |
| 2015/0003699 | A1 | 1/2015 | Davis et al. |
| 2015/0163345 | A1 | 6/2015 | Cornaby et al. |
| 2015/0213325 | A1 | 7/2015 | Krishnamoorthi et al. |
| 2015/0286873 | A1 | 10/2015 | Davis et al. |
| 2016/0086029 | A1 | 3/2016 | Dubuque |
| 2017/0301109 | A1* | 10/2017 | Chan ...................... G06T 7/75 |

FOREIGN PATENT DOCUMENTS

| | | |
|---|---|---|
| WO | WO1998001843 | 1/1998 |
| WO | WO2014195945 | 12/2014 |
| WO | WO2015051421 | 4/2015 |
| WO | WO2015116545 | 8/2015 |
| WO | WO2016033468 | 3/2016 |
| WO | WO2014017267 | 7/2016 |

OTHER PUBLICATIONS

Wu, Zhirong, et al. "3d shapenets: A deep representation for volumetric shapes." Proceedings of the IEEE conference on computer vision and pattern recognition. 2015. 10 pages.*

Schwarz, Max, Hannes Schulz, and Sven Behnke. "RGB-D object recognition and pose estimation based on pre-trained convolutional neural network features." Robotics and Automation (ICRA), 2015 IEEE International Conference on IEEE, 2015. 8 pages (Year: 2015).*

Paletta, Lucas, and Axel Pinz. "Active object recognition by view integration and reinforcement learning." Robotics and Autonomous Systems 31.1-2 (2000): 71-86. 16 pages (Year: 2000).*

Kanezaki, Asako, Yasuyuki Matsushita, and Yoshifumi Nishida. "Rotationnet: Joint learning of object classification and viewpoint estimation using unaligned 3d object dataset." arXiv preprint arXiv:1603.06208 (2016). 16 pages (Year: 2016).*

Forough Farshidi, "Robust Sequential View Planning for Object Recognition Using Multiple Cameras", dated Jul. 2005, 119 pages.

Szegedy et al., "Deep Neural Networks for Object Detection", dated 2013, 9 pages.

Wallace Lawson, J. Gregory Trafton, "Unposed Object Recognition Using an Active Approach", dated 2013, 6 pages, Naval Center for Applied Research in Artificial Intelligence, Washington, DC.

Gabriel Oliveira and Volkan Isler, "View Planning for Cloud-Based Active Object Recognition", dated Sep. 12, 2013, 10 pages.

Asako Kanezaki, "Rotation Net: Learning Object Classification Using Unsupervised Viewpoint Estimation" dated Mar. 20, 2016, 16 pages.

Ivana Tosic et al., "Active View Planning by Deep Learning" dated Apr. 10, 2016, 28 pages.

Potthast, et al., "Active Multi-View Object Recognition and Change Detection", printed Jun. 22, 2016, from http://citeseerx.ist.psu.edu/viewdoc/download?doi=10.1.1.712.3973&rep=rep1&type=pdf, 2 pages.

* cited by examiner

ACTIVE VIEW PLANNING BY DEEP LEARNING

BACKGROUND

1. Field of the Invention

The specification generally relates to image processing. In particular, the specification relates to a system and method for identifying an object and a viewpoint from an image with a probability that satisfies a predefined criterion based on deep network learning.

2. Description of the Background Art

Deep neural networks, such as Convolutional Neural Networks (CNNs), have demonstrated success on a variety of fields and applications. However, when it comes to real-time mobile vision system applications, the use of deep neural networks is limited. A mobile vision device in some examples is a mobile robotic system equipped with a camera such as a drone, a robot, a mobile phone, a medical scope (e.g., an otoscope), etc. The current CNNs have been used to recognize an object from an image, recognize a viewpoint of an object, or both. However, there is not a working mechanism that uses the image and viewpoint recognition information received from the deep neural networks (such as CNNs) to provide guidance to the real-time navigation of the mobile vision device that captures the images. For example, there is no prediction mechanism that predicts the movement of the mobile vision device based on recognition of objects and viewpoints using deep neural networks.

SUMMARY

The techniques introduced herein overcome the deficiencies and limitations of the prior art, at least in part, with a system and method for identifying an object and a viewpoint from an image with a probability that satisfies a predefined criterion based on deep network learning, and using that output to guide a mobile vision system. The system is configured to receive a first image. The system is further configured to perform recognition on the first image to determine an object, a viewpoint and a probability of recognition. The system is further configured to determine a first expected gain in the probability of recognition when a first action is taken and a second expected gain in the probability of recognition when a second action is taken. The system is further configured to identify a next action from the first action and the second action based on an increase in expected gains.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
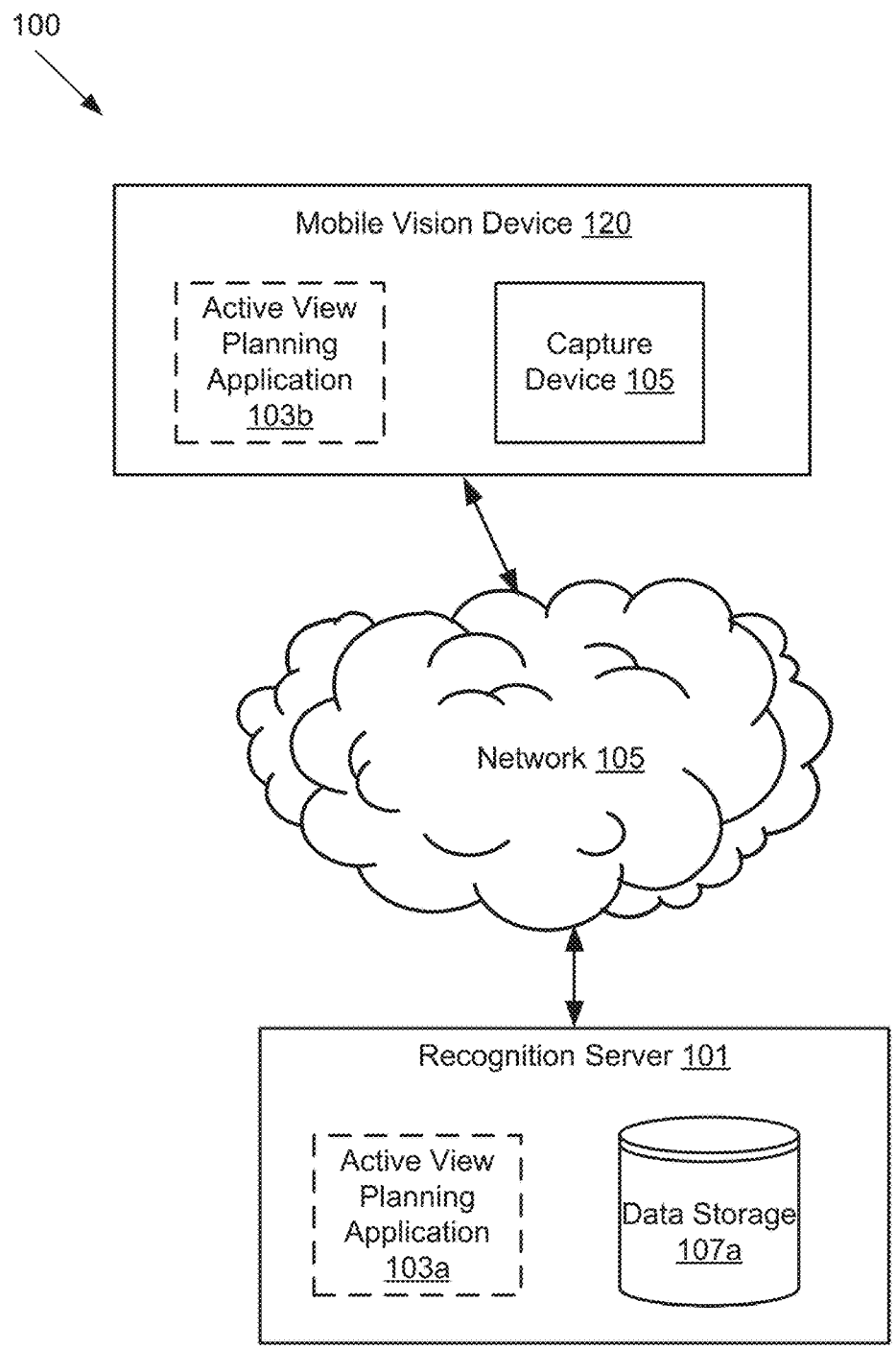
FIG. 1 depicts a high-level block diagram illustrating one embodiment of a system for identifying an object and a viewpoint from an image with a probability that satisfies a predefined criterion based on deep network learning.

FIG. 1 depicts a high-level block diagram illustrating one embodiment of a system 100 for identifying an object and a viewpoint from an image with a probability that satisfies a predefined criterion based on deep network learning, and using that output to guide a mobile vision system through active view planning method. The illustrated mobile vision system 100 includes a recognition server 101 and a mobile vision device 120. In the illustrated embodiment, the entities of the system 100 are communicatively coupled via a network 105. Although only a single recognition server 101, a single mobile vision device 120, a single network 105 coupled to the recognition server 101 and the mobile vision device 120 are shown in FIG. 1, it should be understood that there may be any number of recognition servers 101 or a server cluster, any number of mobile vision devices 120, and one or more networks 105 that connect these entities.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

The recognition server 101 may be either a hardware server, a software server, or a combination of software and hardware. The recognition server 101 may be, or may be implemented by, a computing device including a processor, a memory, applications, a database, and network communication capabilities. In some embodiments, the recognition server 101 trains a deep convolutional neural network and uses the convolutional neural network as a classifier to perform recognition on an image to recognize an object and a viewpoint with a certain probability. In other embodiments, the recognition sever 101 may also identify an action for a mobile vision device 120 (described below) such that the mobile vision device 120 can move to a new location and take a new image. From this new image, the object and the viewpoint can be recognized with an increased probability.

In some embodiments, the recognition server 101 sends and receives data to and from other entities of the system 100 via the network 105. For example, the recognition server 101 receives image and location data from the mobile vision device 120 and sends a recognition result to the mobile vision device 120.

In some embodiments, the recognition server 101 also includes a data storage 107a. The data storage 107a is a non-transitory memory that stores data for providing the functionality described herein. For example, the data storage 107a may store a set of training data, information associated with the convolutional neural networks, recognition results, etc. The data stored in the data storage 107a is described below in more detail.

The mobile vision device 120 is a computing device including a processor, a memory, applications, a database, and network communication capabilities. For example, the mobile vision device 120 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with the recognition sever 101. The mobile vision device 120 receives an image and location information associated with the image, and performs object recognition on the image based on the location information to recognize an object and a viewpoint from the image with a probability of recognition. In the illustrated embodiment, the mobile vision device 120 includes a capture device 105, e.g., a camera. The capture device 105 captures an image from a scene and determines location information associated with the image.

In some embodiments, the mobile vision device 120 is a mobile robotic system equipped with a camera that possesses the capability of navigating throughout its environment and acquiring multiple images of a same object from various viewpoints. For example, the mobile vision device 120 can be a drone, a robot, or a mobile imaging system such as otoscope, endoscope, camera on a car, or other moving platform. The mobile vision device 120 can intelligently acquire image measurements in order to recognize an object and its relative position with a high degree of certainty. In some embodiments, the mobile vision device 120 identifies an action that details movement of the mobile vision device 120 in a certain way such that an image, which is captured by the mobile vision device 120 at a location that the mobile vision device 120 repositioned to responsive to taking the action, includes more information for attaining a more accurate recognition result.

In some embodiments, the recognition server 101 includes an active view planning application 103a. The active view planning application 103a may include software and/or logic to provide the functionality for training a convolutional neural network (e.g., a training module 203) and uses the convolutional neural network (e.g., an image processing module 204) as a classifier to perform recognition on an image to recognize an object and a viewpoint with a probability of recognition as described below with reference to FIGS. 2A and 2B. In some embodiments, the active view planning application 103a can be implemented using programmable or specialized hardware. In some embodiments, the active view planning application 103a can be implemented using a combination of hardware and software. In other embodiments, the active view planning application 103a may be stored and executed on a combination of the mobile vision device 120 and the recognition server 101.

A convolutional neural network (CNN) is a feed-forward artificial neural network used in machine learning, which has wide applications in image and video recognition, recommender systems, natural language processing, etc. When used in image recognition, the CNN includes multiple layers of small neuron collections that process portions of an input image. The outputs of the collections are tiled so that the portions of the input image overlap to obtain a better representation of the original input image. The CNN is mainly used to recognize an object from an image. However, in many cases (e.g., visual search), there is a problem about what viewpoint an image is taken. An object may be more recognizable from one side than from another side. The viewpoint of the image directly affects the recognition result of the image as a bad viewpoint may lead to a bad recognition result.

The active view planning application 103a receives a set of training data and trains the CNN based on the set of training data to recognize an object and a viewpoint. For example, the active view planning application 103a receives images with ambiguous viewpoints and trains the CNN to distinguish the viewpoints between the images. In some embodiments, the active view planning application 103a generates a recognition result including a probability of recognition. This probability indicates a degree of certainty about an image including an object and a viewpoint. For example, the active view planning application 103a may receive an image, process the image, and determine that there is a 78% chance that the image includes a tea box and was taken from a 70 degree angle.

Up to this point, the active view planning application 103a obtains the recognition result from a single image. Such recognition result may not be very accurate due to the limited amount of information extracted from the single image. To increase the recognition accuracy, the active view planning application 103a computes the probability that an image contains an object at a certain viewpoint, integrates this probability with information of previous images of the object at different viewpoints, and determines an overall probability based on the information from the images. Continuing this example, the active view planning application 103a may determine that a first image includes a tea box seen from 70 degree angle with a probability of 78%. As images accumulates, the active view planning application 103a may determine that the fifth image includes the tea box seen from 60 degree angle with a probability of 96% based on the information received from the first, second, third, fourth, and fifth images.

An active view planning algorithm can be used to integrate information from current and past images to determine the overall probability of accurate recognition. In some embodiments, the active view planning method is implemented by the active view planning application 103a on the recognition server 101. In other embodiments, the active view planning method is implemented by the active view planning application 103b on the mobile vision device 120. The active view planning application 103b on the mobile vision device 120 performs similar functionality as the active view planning application 103a on the recognition server 101. The active view planning method is described below with reference to the active view planning application 103b in an example scenario where the mobile vision device 120 is a mobile robotic system (e.g., a drone).

Figure 5:
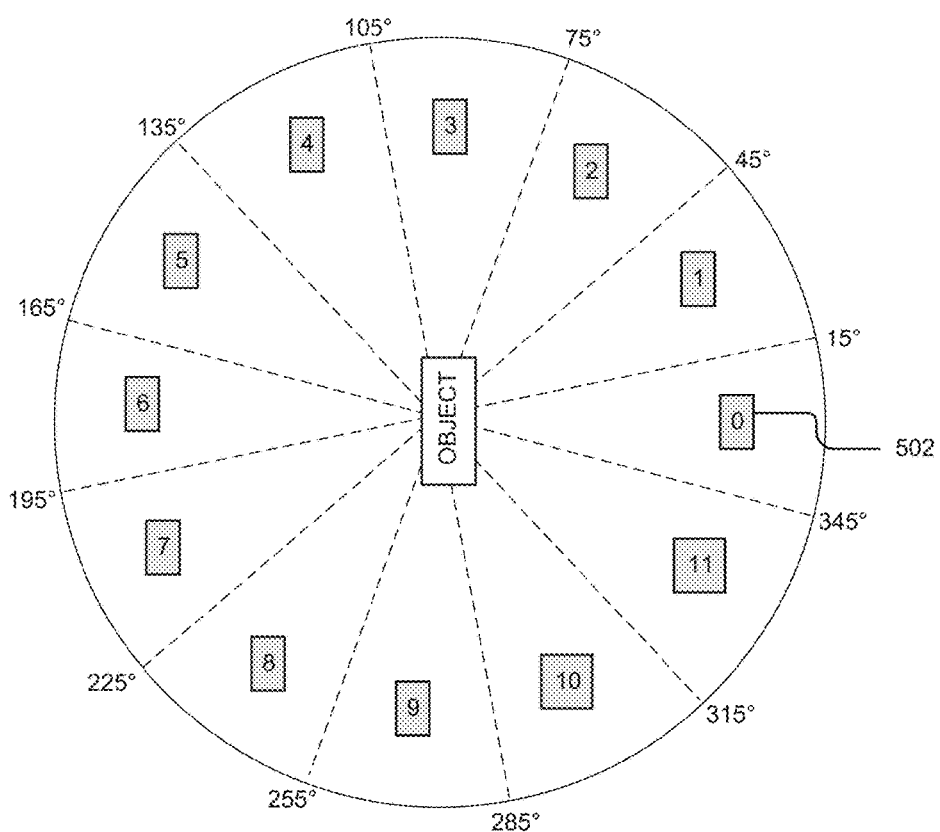
FIG. 5 depicts a diagram of example viewpoint partitions.

In some embodiments, the active view planning application 103b determines an accumulated probability that indicates a current belief of a current image including an object and a viewpoint based on information of past images and the current image. The current image and past images are images of the object captured by a mobile vision device 120 at different time instants and different locations from different viewpoints. For example, a drone captures images of a tea box on a shelf of a store from the right, the left and the middle. When considering such orientation (e.g., right, left and middle, etc.), the active view planning application 103b labels the orientation and the location of an object with a local coordinate frame, for example, a coordinate frame of the camera equipped with the drone. Since the drone moves, this camera coordinate frame varies. So the right is relative to a first location of the camera, the left is relative to a second location of the camera after the camera moved from the first location to the second location, and the middle is relative to a third location of the camera after the camera moved from the second location to the third location. To accurately combine information from these images, the active view planning application 103b determines a normalized distribution by modifying the current belief to be relative to a same coordinate frame to compensate the change of the camera coordinate frame. For example, the active view planning application 103b modifies the current belief to be relative to the most recent image captured by the camera of the drone. The viewpoints described herein may be in 2D space (e.g., as shown in FIG. 5), but it should be understood that they could also be in 3D space with additional viewpoints along a Z axis.

The drone moves to multiple locations to capture images with each new image reducing the uncertainty of a recognition result. Different locations the drone moved to may result in different reduction of uncertainty. For example, if the current image shows little information of the right side of a tea box, the drone may fly to the right instead of flying to the left to take a new image that includes more information of the right side of the tea box. In some embodiments, responsive to the normalized distributions, the active view planning application 103b computes expected information gains (i.e., reduction of uncertainty) for a set of possible actions and identifies an action that details the movement of the drone based on the expected information gains. Continuing with the above example, the active view planning application 103b computes that the expected information gain by moving right is 0.2 bits and that the expected information gain by moving left is 0.10 bits. The active view planning application 103b therefore determines that the next action that the drone should take is to move right. In some embodiments, the active view planning application 103b identifies an action that increases, increases above a threshold, or maximizes the expected information gain as the next action of the drone. The operation of the active view planning application 103a, 103b and the functions listed above are described below in more detail with reference to FIGS. 8-11.

The techniques described herein are advantageous in various aspects. First, the system described herein recognizes both an object and a viewpoint from an image, and therefore provides a solution to the difficult problem of viewpoint identification existed in many fields such as visual search. Second, the system described herein performs image recognition using classifiers of convolutional neural networks and based on integration of information from current and previous images to increase accuracy and efficiency of the recognition. Third, the system described herein predicts a next action for a mobile vision device 120 in a way that this action can lead to a great increase of recognition accuracy or even maximize the increase of recognition accuracy. So instead of blindly navigating around an object to attempt to find a good location and viewpoint to take a good image that can be accurately recognized, the mobile vision device 120 knows where to go and from which viewpoint to take this good image in a shortest time. The efficiency is therefore increased. This is particularly advantageous because a certain recognition accuracy can be achieved with a small number of images as compared to the existing image recognition systems. Fourth, the system described herein determines whether an action is necessary before identifying the action, and therefore saves computation time of the complex computation for identifying the action.

Figure 2A:
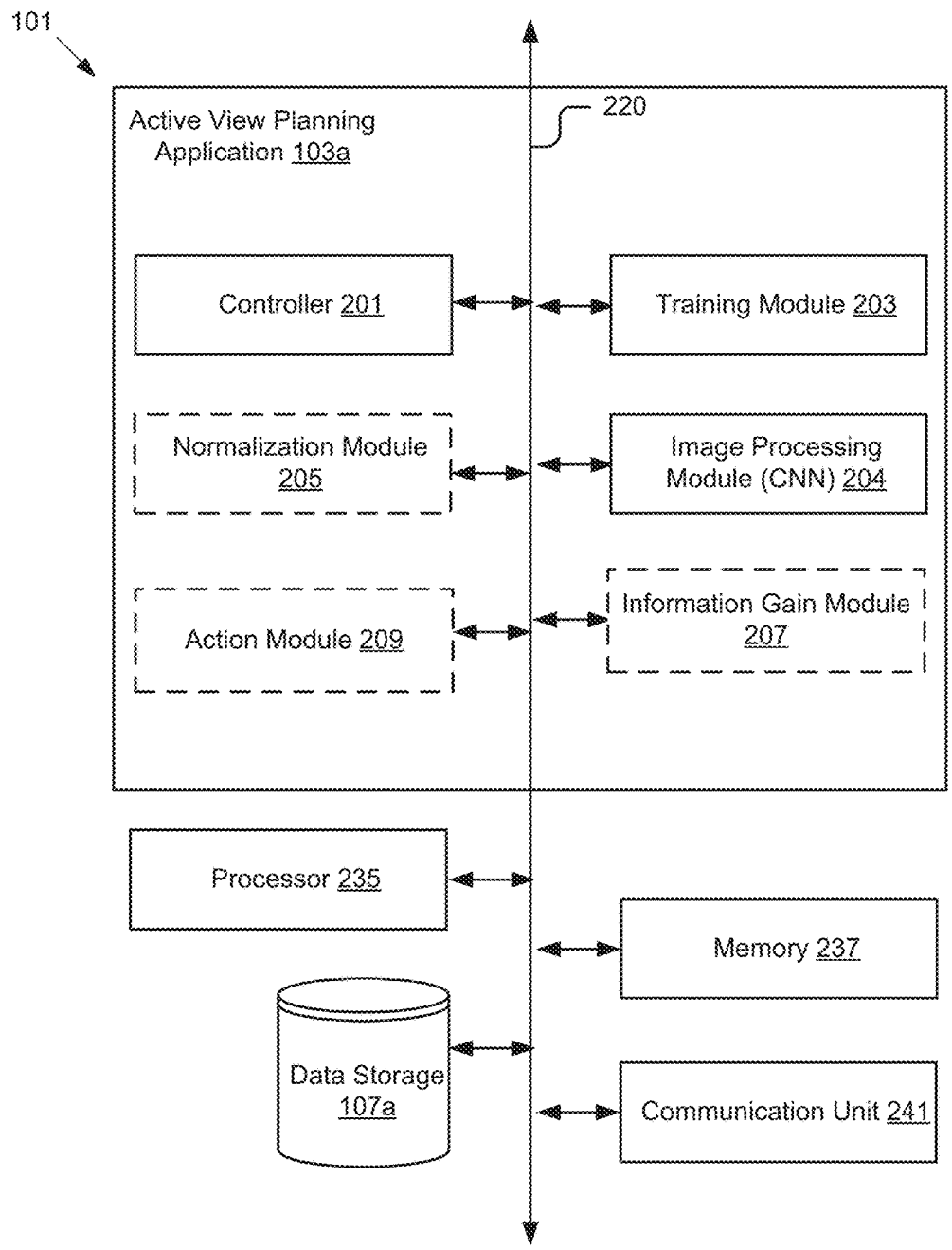
FIG. 2A depicts a block diagram illustrating one embodiment of a recognition server including an active view planning application.

FIG. 2A depicts a block diagram illustrating one embodiment of the recognition server 101 including an active view planning application 103a. The recognition server 101 may also include a processor 235, a memory 237, a communication unit 241, and data storage 107a according to some examples. The components of the recognition server 101 are communicatively coupled to a bus or software communication mechanism 220 for communication with each other.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of user interfaces used in scheduling a consultation, and performing complex tasks including training a convolutional neural network, performing image recognition using the convolutional neural network, identifying an action that increases the recognition accuracy based on the recognition result from the convolutional neural network, etc. In some implementations, the processor 235 may be coupled to the memory 37 via the bus 220 to access data and instructions therefrom and store data therein. The bus 220 may couple the processor 235 to the other components of the recognition server 101 including, for example, the memory 237, the communication unit 241, the active view planning application 103a, and the data storage 107a. It will be apparent to one skilled in the art that other processors, operating systems, and physical configurations are possible.

The memory 237 may store and provide access to data for the other components of the recognition server 101. In some implementations, the memory 237 may store instructions and/or data that may be executed by the processor 235. The instructions and/or data may include code for performing the techniques described herein. For example, in one embodiment, the memory 237 may store the active view planning application 103a. The memory 237 is also capable of storing other instructions and data, including, for example, an operating system, hardware drivers, other software applications, databases, etc. The memory 237 may be coupled to the bus 220 for communication with the processor 235 and the other components of the recognition server 101.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, EPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as an image from the mobile vision device 120, and transmits the image to the controller 201. The communication unit 241 also transmits information to the mobile vision device 120. For example, the communication unit 241 transmits information associated with a trained convolutional neural network to the mobile vision device 120. The communication unit 241 is coupled to the bus 220. In one embodiment, the communication unit 241 may include a port for direct physical connection to the network 105. In another embodiment, the communication unit 241 may include a wireless transceiver (not shown) for exchanging data with the mobile vision device 120 or any other communication channel using one or more wireless communication methods, such as IEEE 802.11, IEEE 802.16, Bluetooth®, cellular communications, or another suitable wireless communication method.

The data storage 107a is communicatively coupled to the bus 220. As described above, the data storage 107a stores information that is used to provide functionality as described herein, such as a set of training data, information associated with a convolutional neural network, and probabilities of recognition from the convolutional neural network.

The components of the active view planning application 103a may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

In some embodiments, the active view planning application 103a includes a controller 201, a training module 203, an image processing module (CNN) 204, and may optionally include a normalization module 205, an information gain module 207, and an action module 209.

The controller 201 may include software and/or logic to control the operation of the other components of the active view planning application 103a. The controller 201 controls the other components of the active view planning application 103a to perform the methods described below with reference to FIGS. 8-11. In other implementations, the processor 235, the memory 237 and other components of the active view planning application 103a can cooperate and communicate without the controller 201.

In some embodiments, the controller 201 sends and receives data, via the communication unit 241, to and from the mobile vision device 120. For example, the controller 201 receives an image and location & viewpoint information associated with the image from the mobile vision device 120, and sends a recognition result of the image to the mobile vision device 120. The controller 201 also receives a set of motion commands transferred from the information of an action by the action module 201 and uses the commands to control the motion of the mobile vision device 120 and image capture by the mobile vision device 120.

In some embodiments, the controller 201 receives data from other components of the active view planning application 103a and stores the data in the data storage 107a. For example, the controller 201 may receive a probability of accurately recognizing an object and a viewpoint from the image processing module (CNN) module 204 and store this probability of recognition in the data storage 107a. In other embodiments, the controller 201 retrieves data from the data storage 107a and sends the data to other components of the active view planning application 103a. For example, the controller 201 may retrieve a set of training data from the data storage 107a, and transmit the set of training data to the training module 203 for training a convolutional neural network.

The training module 203 may include software and/or logic to provide the functionality for training a convolutional neural network to recognize both an object and a viewpoint from an image. The viewpoint is a position of the object relative to a camera used to capture the image.

To train a CNN to recognize both an object and a viewpoint, the training module 203 uses a set of training data that includes object images (e.g., training images) and object orientation (pose) data. The pose data is associated with each training image in the set and includes viewpoint information of the object in the training images. The set of training data includes an original dataset of object images and viewpoints, and an augmented dataset of images with ambiguous viewpoints. In some embodiments, the set of training data includes two-dimensional data. In other embodiments, the set of training data is extended to include three-dimensional data. In some embodiments, the training module 203 retrieves the set of training data from the data storage 107a.

Figure 3:
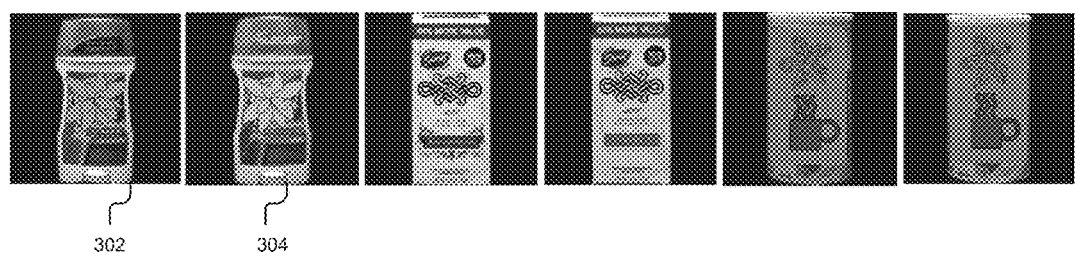
FIG. 3 depicts a graphical representation of example training images taken from a first viewpoint.
Figure 4:
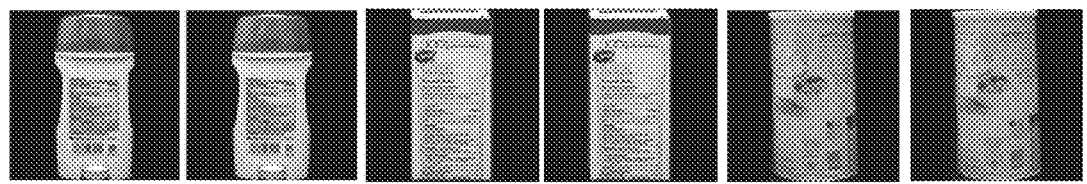
FIG. 4 depicts a graphical representation of example training images taken from a second viewpoint.

An example training dataset used by the training module 203 is a COIL-100 dataset including an original COIL-100 dataset and an augmented dataset. The examples specified here are merely one example of possible implementation of the present invention and it should be understood that datasets other than COIL-100 may be alternatively used to implement the invention. The original COIL-100 dataset includes 100 commonly seen objects from 72 planar viewpoints (i.e., five degree resolution. The augmented data, additionally placed in the COIL-100 dataset by the training module 203, includes three pairs of objects. As a result, the total number of objects in the COIL-100 dataset is 106. Each pair of the three pair of objects contains visually ambiguous viewpoints as seen in FIGS. 3 and 4. FIG. 3 depicts front images of the three pairs or six additional objects added to the COIL-100 dataset. FIG. 4 depicts back images of the six additional objects. The objects shown in FIGS. 3 and 4 are indistinguishable unless an image is taken from a certain vantage point.

In some embodiments, the training module 203 separates the training data to a number of classes, computes a probability associated with each class, and outputs the probability as a result of recognizing an object and a viewpoint. In some embodiments, the training module 203 determines a class and assigns a class label to the class. The class label includes an object label and a viewpoint label. For example, the COIL-100 dataset described above includes 106 objects. The training images for each object in the COIL-100 dataset are split into 12 distinct viewpoints. The training module 203 therefore determines 106×12=1272 classes and assigns 1272 class labels. On the other hand, the current CNN learning algorithms that recognize only objects assigns a class label including only an object label. As to the COIL-100 dataset, the current CNN learning algorithms may assign 106 class labels corresponding to 106 objects as compared to 1272 class labels assigned by the training module 203.

FIG. 5 depicts a graphical representation of example viewpoint partitions. The training images of the COIL-100 dataset are partitioned into 12 distinct viewpoints for each object, i.e., 12 viewpoint classes. Each viewpoint class includes images of an object spanning 30 degrees. Each viewpoint is associated with a viewpoint label such as a label 502. In other embodiments, different numbers of viewpoints may be used that span from 5 degrees to 180 degrees.

Figure 6:
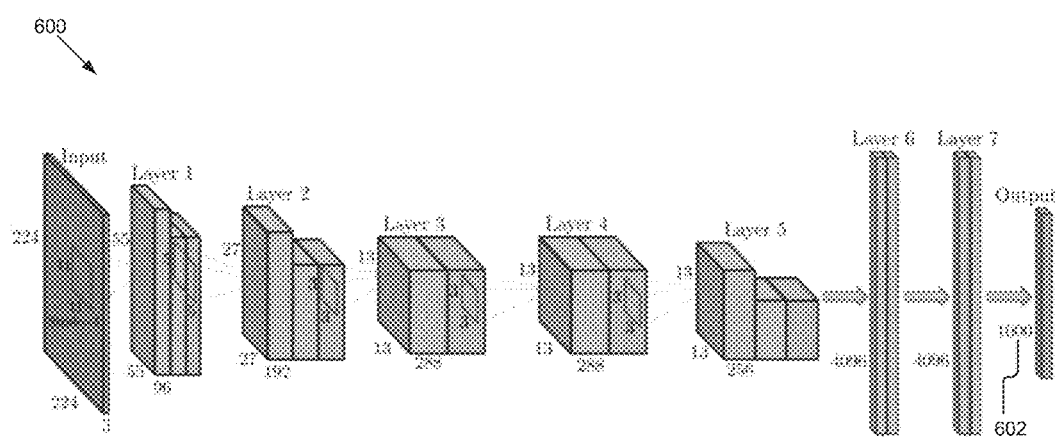
FIG. 6 depicts a block diagram of an example convolutional neural network model.

In one embodiment, the training module 203 uses a deep learning framework (e.g., Caffe) to train the neural network CNN. In practice, a large amount of data samples are needed to fully train the CNN. The COIL-100 dataset includes 106 objects with a total number of 1272 classes, which is far too few amount of data to possibly fully train a deep CNN. Instead of using a small dataset containing only small amounts of variation, the training module 203 fine-tunes an already existing model, for example, an available Caffe model. FIG. 6 depicts a block diagram of an example Caffe BVLC Reference CaffeNet 600 model. The example model 600 was trained on about 1.2 million images. These images are from an ImageNet dataset and are classified into 1000 categories. The model includes five convolutional layers and three fully connected layers. The last layer has 1000 output nodes (e.g., one for each category), which results in a posteriori distribution of a particular class given an image.

The 1.2 million images from the existing model of FIG. 6 already contain a significant amount of variation, which means that the trained convolutional layers are already capable of extracting high-level and discriminative features needed for image recognition. The training module 203 refines this existing model for the purpose of recognizing an object and a viewpoint. In some embodiments, the training module 203 modifies the output layer to contain the number of output nodes 1272, i.e., the training module 203 modifies the number 1000 as indicated by item 602 in FIG. 6 to the number 1272, which equals to the number of classes corresponding to 106 objects and 12 viewpoints. In other embodiments, the training module 203 also trains the last two layers to modify the corresponding weights, while holding the remaining layer weights to their pre-trained values, i.e., the training module 203 re-trains weights connecting layer 6 to layer 7 and weights connecting layer 7 to the output layer, and leaves the remaining layer weights to their initialized values.

The training module 203 trains the CNN and results in a trained CNN, which is capable of recognizing an object and a viewpoint from an image with a probability of recognition. In FIG. 2A, this trained CNN is also referred to as an image processing module (CNN) 204.

The image processing module (CNN) 204 is the trained CNN that receives an input image and generates a CNN distribution output based on the input image. The CNN distribution output is a posterior probability representing a degree of certainty of the input image including an object and being taken from a viewpoint, given the knowledge of the input image.

Assume that the image processing module (CNN) 204 receives a set of training images $L=\{I^{(i)}\}_{i=1,\ldots,N}$ of size $|L|=N$. Each image includes an object $o \in O$ viewed from a viewpoint $v \in V$. Given a size of the object set $|O|=n_O$ and a size of the viewpoint set $|V|=n_V$, the image processing module (CNN) 204 has a total number of classes equal to $n_O n_V$ if each instance in both sets represents a separate class. The image processing module (CNN) 204 represents an object within a given Red Green Blue (RGB) image denoted by a vector of pixels $_x$. In the following, we will refer to the image itself as x. When used as classifiers, the image processing module (CNN) 204 can convert these low-level features $_x$ into higher level features y containing more meaningful information that can be used for classification.

Responsive to receiving an input image $I^{(i)}$ with an RGB pixel representation $x^{(i)}$ (where i is the index of a training image within the set L), the image processing module (CNN) 204 generates a function $f_{(o,v)}(x^{(i)})$, which represents the "score" of the input image containing an object $o \in O$ oriented at a particular viewpoint $v \in V$ with respect to a camera coordinate frame. The "score" $f_{(o,v)}(x^{(i)})$ can be interpreted as the un-normalized log likelihood of the image $x^{(i)}$ given a particular class label (o, v) as shown in Equation 1.

$$f_{(o,v)}(x^{(i)}) = \log(p(x^{(i)})|(o,v)) \qquad \text{(Equation 1)}$$

The image processing module (CNN) 204 applies a softmax function to $f_{(o,v)}(x^{(i)})$ in Equation 1 to yield a result that can be interpreted as the normalized class probability, which is essentially the posterior distribution of a class (o, v) given the image features $x^{(i)}$ as shown in Equation 2.

$$p(o, v \mid x^{(i)}) = \frac{e^{f_{(o,v)}(x^{(i)})}}{\sum_{\tilde{o} \in O} \sum_{\tilde{v} \in V} e^{f_{(\tilde{o},\tilde{v})}(x^{(i)})}} \qquad \text{(Equation 2)}$$

The image processing module (CNN) 204 therefore recognizes an object and a viewpoint by computing a probability that an image includes the object and was taken from the viewpoint, i.e., the posterior distribution in Equation 2. The image can be an image captured by the capture device 105 installed on a mobile vision device 120, or a training image. The image processing module (CNN) 204 outputs this posterior distribution, i.e., the probability of recognition, and transfers this CNN distribution output to other modules and/or devices for further processing. In some embodiments, the image processing module (CNN) 204 stores this posterior distribution output in the data storage 107a.

In some embodiments, the image processing module (CNN) 204 also transfers the distribution output in Equation 2 to the training module 203 to improve the training of the CNN. For any given training image $I^{(i)} \in L$, the true distribution $p_{true}^{(i)}(o,v)$ is a vector of size $n_O n_V$ with all zeros except a one in the location of the correct class ($o=\tilde{o}$, $v=\tilde{v}$). The distribution computed using the softmax function in Equation 2 is an estimated distribution from the CNN. In some embodiments, the training module 203 computes a cross-entropy between the true and the estimated distributions as a loss function in Equation (3):

$$l_{(i)} = -\sum_{o \in O}\sum_{v \in V} p_{true}^{(i)}(o,v) p(o,v \mid x^{(i)}) \quad \text{(Equation 3)}$$

The training module 203 uses the total loss over the training set $$L = \sum_{i=1}^{N} l^{(i)}$$

with a back propagation approach to iteratively adjust the weights of the CNN.

The active view planning application 103a in FIG. 2A also optionally includes the normalization module 205, the information gain module 207, and the action module 209. These modules are optional because operations of these modules can be performed on the recognition server 101 or on other devices such as the capturing device 120. The active view planning application 103a of the recognition server 101 can train a CNN and recognize objects and viewpoints using the CNN, or further improve the recognition results from the CNN depending on whether or not these modules are present. These modules 207-209 will be described in detail below with reference to FIG. 2B.

Figure 2B:
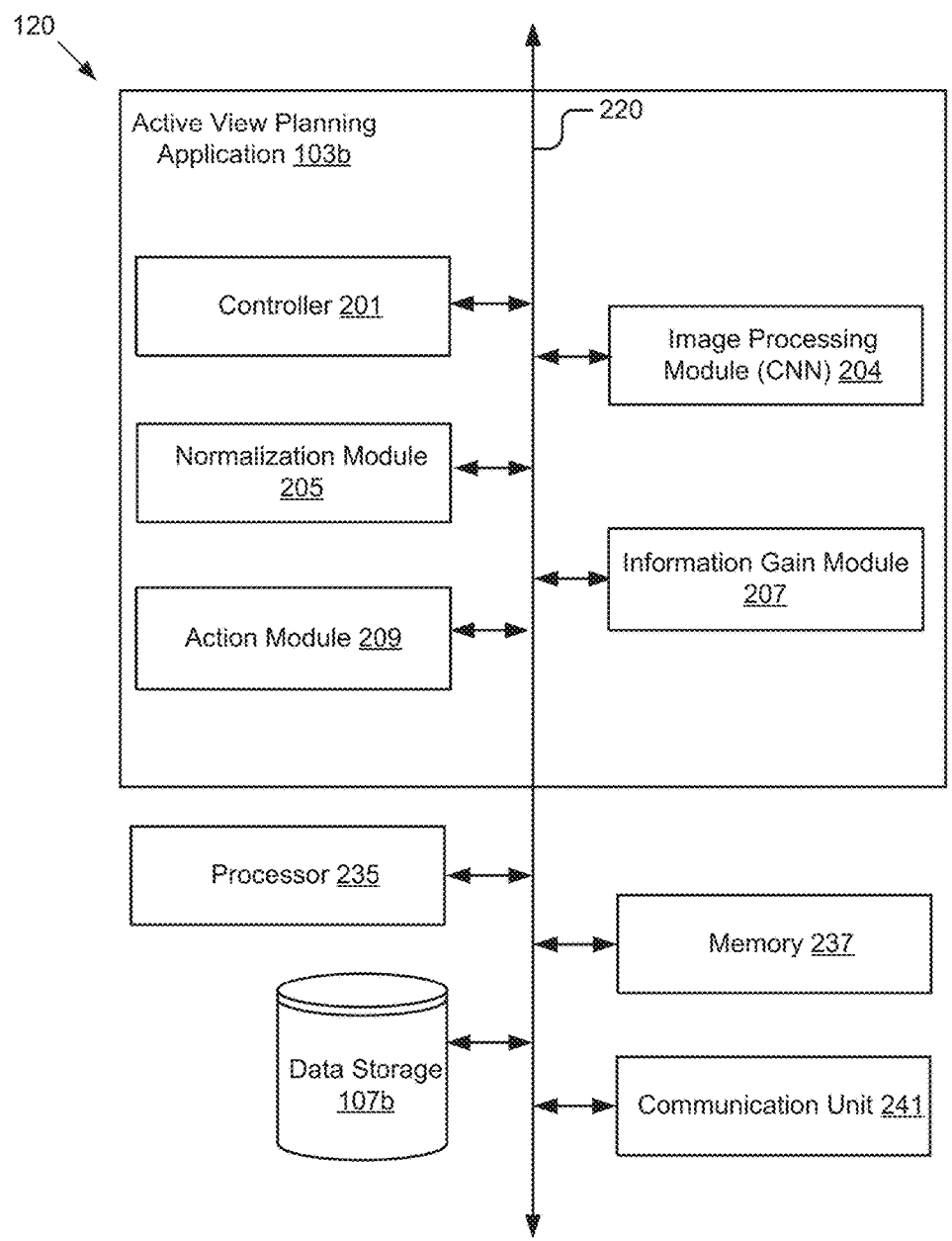
FIG. 2B depicts a block diagram illustrating one embodiment of a mobile vision device including an active view planning application.

FIG. 2B depicts a block diagram illustrating one embodiment of the mobile vision device 120 including an active view planning application 103b. The mobile vision device 120 may also include a processor, a memory, a communication unit, and data storage. The components of the mobile vision device 120 are communicatively coupled to a bus or software communication mechanism for communication with each other. In the example of FIG. 2B, like numerals have been used to reference like components with the same or similar functionality as has been described above for the recognition server 101. Where the components have similar functionality, that description will not be repeated here. However, the mobile vision device 120 differs in some notable respects, for example, the normalization module 205, the information gain module 207, and the action module 209 are not optional for implementing the functionality of the active view planning application 103b.

Figure 7:
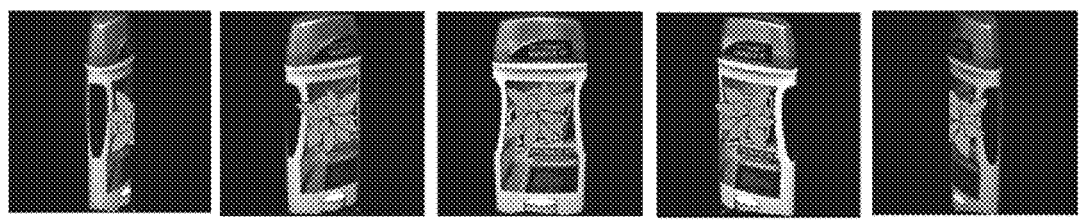
FIG. 7 depicts a graphical representation of example images of an object taken from different viewpoints.

As described above, the image processing module (CNN) 204 outputs a probability of recognition $p(o, v|x^{(i)})$ that represents a degree of certainty of an image $x^{(i)}$ including an object o and being taken from a viewpoint v. The image processing module (CNN) 204 outputs this posterior probability from a single input image $x^{(i)}$. Due to the nature of the dataset and the viewpoint partition structure, it is reasonable to expect this output to be unconfident for any particular object and viewpoint. There may be problematic situations that the viewpoints of an object are ambiguous, the object itself is confused with other objects in the dataset, or any combination of ambiguous objects and viewpoints. FIG. 7 depicts images of an object taken from different viewpoints. From the left to the right, the images in FIG. 7 are taken from viewpoint partitions 10, 11, 0, 1, and 2. The partition labels are shown in FIG. 5. The object in FIG. 7 is recognizable for any particular image, but, in some cases, it may be difficult to distinguish between viewpoints because of the visual similarity of each class (e.g., a torus). In another situation, an object itself may be confused with other objects as shown in FIG. 4.

This inherent uncertainty can be dealt with by combining the states of belief from single image measurements (e.g., the probability $p(o,v|x^{(i)})$) into a joint distribution utilizing all of the available information. The available information may include multiple object images taken at multiple locations and at multiple time instants from multiple viewpoints. For example, in addition to a most recent image of a object captured by the capture device 105, previous images of the object captured by the capture device 105 may also be used. A joint distribution resulted from combining available information provides a far greater certainty than the individual probability of recognition obtained from any single image alone could provide. Each additional image eliminates some degree of uncertainty about the object o and viewpoint v. The modules 205-209 communicate with the image processing module (CNN) 204 to implement an active view planning method that evolves the state of belief to plan out future locations for a mobile vision device. Images taken from these future locations are expected to increase the certainty and eventually result in a largest reduction of uncertainty about the object o and viewpoint v. For example, CNN learning indicates that it is 65% chance that a first image taken by a drone is an oatmeal box viewed from 60 degree angle. Based on the information of the first image, the modules 204-209 perform the active view planning method and tell the drone which location to fly to and which viewpoint should be used to take a second image. Based on the combined information of the first image and the second image, the modules 204-209 tell the drone at which location and which viewpoint to take a third image. The procedure repeats until a certain criterion is met, for example, the procedure stops when it is 99% certain that after an $N^{th}$ image is taken the object is an oatmeal box from 75 degree angle.

The normalization module 205 may include software and/or logic to provide the functionality for determining a current belief of a current image including an object and a viewpoint based on past images evaluated in previous actions and previous time instants and modifying the current belief to compensate a change of a coordinate frame. While shown as a block in active view planning application 103a in FIG. 2A, it should be understood that some or all of the operations performed by the normalization module 205 may be performed entirely at the recognition server 101 or the mobile vision device 120, or in yet other embodiments the operations may be split between the normalization module 205 on the recognition server 101 and the normalization module 205 on the mobile vision device 120.

The image processing module (CNN) 204 outputs a probability of recognition $p(o, v|x)$ based on the image x, that captures an object at a certain position and orientation. The orientation and the location of the object are labeled with respect to a world coordinate frame, for example, a coordinate frame of a camera that is used to capture the image x. If an image of a tea box is from a 45 degree, this 45 degree is relative to the location of the camera when the camera was used to take this image. However, this camera coordinate frame is not fixed. When a mobile vision device (e.g., a drone) moves, the camera installed on the mobile vision device also moves. The camera coordinate frame therefore moves with the mobile vision device. As described above, one way to increase the probability of recognition is to generate a joint distribution based on combining multiple images of the object taken at multiple locations and at multiple time instants from multiple viewpoints. To accurately combining information from multiple images, the normalization module 205 normalizes the probability of recognition to compensate the change of the camera coordinate frame.

In order to compensate the change of the coordinate frame, the normalization module 205 needs the position information of the mobile vision device 120 with respect to a world coordinate frame, i.e., the absolute coordinate frame. In some embodiments, the normalization module 205 includes a location module (not shown) to determine a location of the mobile vision device 120. For example, the location module can be a self-localization module installed on the mobile vision device 120 that performs simultaneous localization and mapping (SLAM). In other embodiments, the normalization module 205 communicates with an external device, for example, a Kinect sensor from Microsoft Corporation, to locate the mobile vision device 120. The following description is based on the normalization module being able to receive the position information of the mobile vision device 120.

Assume that $p^t(o,v|x^{0:t})$ represents the state of belief about an object o and its viewpoint v relative to the camera frame at time t based on all measurements (e.g., past images) from times 0, 1, . . . , t. The time t is a discrete value indicating how many measurements have been taken up until this point. This distribution is a combination of each individual output distribution $p^t(o,v|x^t)$ received from the classifier, i.e., the image processing module (CNN) 204. The individual output distribution $p^t(o,v|x^t)$ from the CNN is distinguished from the accumulated distribution $p^t(o,v|x^{0:t})$ by the conditional dependence. $p^t(o,v|x^t)$ depends on only one image $x^t$ as opposed to $p^t(o,v|x^{0:t})$ depending on multiple images $x^{0:t}$ (where $0:t = \{0, 1, \ldots, t-1, t\}$).

Assume that $a^t \in A$ is an action performed by a mobile vision device 120 detailing a movement (e.g., location, viewpoint, etc.) and acquiring image measurement at time t. This action is chosen from a measurement action set $A = \{0, 1, \ldots, N_{V-1}, N_V\}$, which denotes the locations for the mobile vision device 120 to position itself such that an image of an object can be acquired from a viewpoint. The locations and the viewpoint partitions (as shown in FIG. 5) have a one-to-one relationship such that only one image is taken from each viewpoint partition. This one-to-one relationship also represents that the maximum number of actions/measurements is equal to $n_V$. In practice, once an image measurement is taken, an action is removed from the action set A to prevent the same action from being selected again. So if an action is to take an image from partition 6 at time instant t−1, this action will be removed such that no additional image is taken again from partition 6 at time t, t+1, . . . .

Although the action set A has the same size as the viewpoint set V, a=0 does not necessarily correspond to viewpoint partition v=0 because an object's initial orientation is unknown, i.e., a mobile vision device 120 may approach the object for the first image measurement from any direction. Depending on how the mobile vision device 120 approaches the object for the first measurement, view partitions of FIG. 5 can be rotated. The rotation, which corresponds to the angle of the object's coordinate frame relative to the mobile vision device 120 (camera) coordinate frame, is initially unknown.

As shown in Equation 4 below, the normalization module 205 uses the value of $a^t$ to calculate the relative change in angle $\delta\theta(a^t)$ that the mobile vision device 120 needs to make between where it last acquired an image at time t−1 and where it plans on acquiring the next image at time t.

$$\delta\theta(a^t) = (a^t - a^{t-1}) * \frac{360°}{n_V}$$ (Equation 4)

When $n_V = 12$ as in FIG. 5, the normalization module 205 determines that the mobile vision device 120 can change its heading angle only in increments of 360°/12=30°, which ensures that each image measurement is taken from a separate viewpoint partition.

Assume that the first measurement action is always $a^0 = 0$ and the mobile vision system orientation with respect to the world coordinate frame (in some embodiments estimated by the location module) at this time can be stored for future reference by denoting a coordinate frame $M_{a^0}$. Similarly, each further measurement action $a^t$ stores its own coordinate frame $M_{a^t}$.

Assuming that the initial state of belief (before the first measurement) is uniformly distributed over all classes because there is no prior information, i.e., the object and the viewpoint are initially uncertain. Once the first image measurement is taken at t=0, the probability $p^0(o,v|x^0)$ is directly equal to the first CNN output distribution. The distribution $p^0(o,v|x^0)$ gives the belief of an object o and viewpoint v oriented with respect to the mobile vision system coordinate frame at time t=0 while $M_{a^0}$ stores the information of how the mobile vision device 120 is oriented with respect to the world coordinate frame. The next action at t=1 yields a CNN output distribution $p^t(o,v|x^t)$ representing the belief of an object o with viewpoint v oriented with respect to the mobile vision system coordinate frame at time t=1.

In order to combine the independent measurement distributions for some images of an object o and viewpoint v, the normalization module 205 performs normalization by rotating the distributions $p^t(o,v|x^t)$ for all values of t to a same coordinate frame. In some embodiments, the normalization module 205 selects a common coordinate frame from the set $\{M_{a^0}, \ldots, M_{a^t}\}$ for some value $t=\bar{t}$, and transfers the distribution $p^t(o,v|x^t)$ to be relative to the mobile vision system coordinate frame $M_{a^{\bar{t}}}$ based on the selection of the common coordinate frame $M_{a^{\bar{t}}}$. Responsive to this transfer, the normalization module 205 further shifts the distribution $p^t(o,v|x^t)$ that is relative to the mobile vision system coordinate frame $M_{a^{\bar{t}}}$ to be relative to the world coordinate frame. In some embodiments, the normalization module 205 selects the common coordinate frame to be the most recent frame $M_{a^t}$ to shift the distributions to be relative to the most recent measurement.

Assume that $p^t(o,v|x^t)$ is the most recent CNN distribution output relative to $M_{a^t}$, and $p^{t-1}(o,v|x^{t-1})$ includes the information of all previous image measurements from t=0 to t−1 relative to $M_{a^{t-1}}$. The normalization module 205 computes the relative viewpoint change between these two measurements from $a^t$ and $a^{t-1}$ in Equation 5.

$$\delta_v = (a^t - a^{t-1})$$ (Equation 5)

To shift the distribution to match the coordinate frame of the newest measurement at time t, the normalization module 205 changes the belief at time t−1 for a particular viewpoint $_v$ to a belief for viewpoint $_{v+\delta_v}$ as in Equation 6:

$$p^t(o,v|x^{0:t-1})=p^{t-1}(o,\mathrm{mod}(v+\delta_V)|x^{0:t-1}) \quad \text{(Equation 6)}$$

where function mod(.) denotes the modulo operator with modulus $n_V$, since viewpoint can only take on values contained within the viewpoint partition set V=(0, 1, ..., $n_{V-1}$, $n_V$).

To simplify later derivations, Equations 5 and 6 can be combined into a single expression denoted by the function $T_{a^t}[.]$.

$$p^t(o,v|x^{0:t-1})=T_{a^t}[p^{t-1}(o,v|x^{0:t-1})]=p^{t-1}(o,\mathrm{mod}(v+a^t-a^{t-1})|x^{0:t-1}) \quad \text{(Equation 7)}$$

Using Equation 7, the normalization module 205 normalizes the distributions from two successive measurements to the same coordinate frame. The normalization module 205 combines the information to form a new updated distribution $p^t(o, v|x^{0:t})$, which indicates a current belief that the current image at time t including an object o and a viewpoint v based on past images evaluated in previous actions and previous time instants and the current image, and has compensated the change of the camera coordinate frame.

Based on the assumption of independent measurements $x^t$ given (o, v), i.e., the prior distribution over (o, v) is uniform, the normalization module 205 computes the updated distribution using Bayes' Theorem in Equation 8.

$$p^t(o, v | x^{0:t}) = \frac{1}{Z} p^t(o, v | x^t) T_{a^t}[p^{t-1}(o, v | x^{0:t-1})] \quad \text{(Equation 8)}$$

where the value Z is a normalizing constant that makes the distribution valid and sum up to one.

The accumulated distribution $p^t(o,v|x^{0:t})$ in Equation 8 indicates a current belief that the acquired image includes the object and the viewpoint based on all previous experience data (including the image acquired in time instant t). As the amount of experience data increases, the accumulated distribution $p^t(o,v|x^{0:t})$ increases and, correspondingly, the recognition accuracy increases. For example, the normalization module 205 computes a degree of certainty 70% about a recognition result based on a single image (i.e., the first image) without any prior information. Once a mobile vision device 120 captures a second image, the normalization module 205 may increase the degree of certainty about the recognition result to 80% based on the second image and prior information (i.e., the first image). In some embodiments, the normalization module 205 transfers the accumulated distribution $p^t(o,v|x^{0:t})$ to the action module 209 such that the action module 209 can determine whether to perform an action. The action module 209 will be described below. In other embodiments, the normalization module 205 also stores the accumulated distributions in the data storage 107b.

The information gain module 207 may include software and/or logic to provide the functionality for computing an expected information gain based on the accumulated distributions/current belief received from the normalization module 205. The expected information gain is used to identify a next action taken by a mobile vision device 120. Similar to the normalization module 205, while shown as a block in active view planning application 103a in FIG. 2A, it should be understood that some or all of the operations performed by the information gain module 207 may be performed entirely at the recognition server 101 or the mobile vision device 120, or in yet other embodiments the operations may be split between the information gain module 207 on the recognition server 101 and the information gain module 207 on the mobile vision device 120.

Assume that an image measurement acquired at time t have the CNN distribution output $p^t(o,v|x^t)$ and that the previous information is stored in the distribution $p^{t-1}(o,v|x^{0:t-1})$. The normalization module 205 uses Equation 8 to compute an updated belief $p^t(o,v|x^{0:t})$. As described above, acquiring new measurements reduces the uncertainty about an object o with viewpoint v. Therefore, between time t−1 and t, there is a reduction in uncertainty, or gain of information, from distributions $p^{t-1}(o,v|x^{0:t-1})$ to $p^t(o, v|x^{0:t})$.

Following the image acquisition at time instant t−1, an action $a^t$ is selected from the set of possible actions A (e.g., by the action module 209 described below) for the mobile vision device 120 to move to the next viewpoint at time instant t. By performing the action $a^t$ the mobile vision device 120 moves to a new location and captures a new image of an object at the new location from a new viewpoint. Each realization of the action variable $a^t$ from the set of possible actions A would result in a correspondingly different new RGB pixel image $x[a^t]$, and a different CNN distribution output $p^t(o,v|x[a^t])$. The accumulated distribution $p^t(o,v|x^{0:t-1},x[a^t])$ is therefore different for each action $a \in A$. Based on these possibilities, an action can be selected. For example, an action that achieves the largest reduction in uncertainty or the largest increase of recognition accuracy may be selected as a next action taken by the mobile vision device 120.

In some embodiments, the information gain module 207 computes the information gain IG(.) to quantify the reduction in uncertainty. In Equation 9 below, the information gain module 207 computes the IG(.) that is synonymous with Kullback-Leibler divergence.

$$IG(a^t) = \sum_{o \in O} \sum_{v \in V} p^t(o, v | x^{0:t-1}, x[a^t]) \log \frac{p^t(o, v | x^{0:t-1}, x[a^t])}{T_{a^t}^t[p^{t-1}(o, v | x^{0:t-1})]} \quad \text{(Equation 9)}$$

The action $a \in A$ with the larger information gain is more likely to be taken by a mobile vision device 120 to achieve the higher recognition accuracy. In order to calculate the information gain and further to determine the action, an image measurement $x[a^t]$ has be known. However, $x[a^t]$ can only be found after the mobile vision device 120 has performed the action to reposition and take the image. A practical approach is that the information gain module 207 computes an expected information gain at a time instant t for each potential action $\tilde{a}^{t+1} \in A$, to move to the next viewpoint at a future time instant t+1, and identifies the action with the largest expected information gain.

In some embodiments, the information gain module 207 uses a predictive CNN output distribution $\tilde{p}^{t+1}(o,v|x[\tilde{a}^{t+1}])$ in place of the actual CNN distribution output $p^{t+1}(o,v|x[a^{t+1}])$ to compute the expected information gain for a future time t+1. In some embodiments, the information gain module 207 computes the predictive CNN output distribution based on the set of training images, which is split into separate sets $I_{\tilde{o},\tilde{v}}$ each including only images with a known object õ and viewpoint ṽ. Although for any image $i \in L_{\tilde{o},\tilde{v}}$ the object and viewpoint is known, the CNN output distribution p(o, $v|x^{(i)}$) remains uncertain for any particular estimated class $(o, v)$. Certain classes (e.g., as in FIG. 3) may have very high values for $p(o=õ, v=ṽ|x^{(i)})$ as compared to other classes (e.g., as in FIGS. 4 and 7). Although this uncertainty is unwanted from the perspective of training a classifier, it explains why certain actions $a \in A$ provide a higher reduction in uncertainty than others. The particular classes with very distinct visual features would provide a much higher information gain if an action $a^{t+1}$ were to select this viewpoint for acquiring a next image.

As shown in Equation 10, the information gain module 207 computes an average CNN distribution output $Q(o,v|õ,ṽ)$ given a particular class label $(õ,ṽ)$.

$$Q(o, v | õ, ṽ) = \frac{1}{N_{(õ,ṽ)}} \sum_{i \in I(õ,ṽ)} p(o, v | x^{(i)}) \quad \text{(Equation 10)}$$

where $N_{(õ,ṽ)} = |L_{(õ,ṽ)}|$ is the size of the set $L_{(õ,ṽ)}$ and serves to normalize the expected distributions to sum to one.

The average CNN distribution output $Q(o,v|õ,ṽ)$ can be visualized as a large matrix of size $n_O n_V$ by $n_O n_V$. Each row of the matrix corresponds to a particular true object $õ$ and viewpoint $ṽ$. The column values for a particular row are the average CNN distribution output for all images $i \in I_{õ,ṽ}$ with each column corresponding to a different estimated object $o$ and viewpoint $v$. An ideal classifier would create an identity matrix for Q. In practice, Q is essentially a confusion matrix for the training data that has been trained.

If the actual object $õ$ and viewpoint $ṽ$ are known, the information gain module 207 may use the corresponding row of $Q(o,v|õ,ṽ)$ to estimate the predictive CNN output distribution $\tilde{p}^{t+1}(o,v|x[ã^{t+1}])$ for some potential action $ã^{t+1}$. In application, however, the current state of belief $p^t(o, v|x^{0:t})$ is split over all classes $(o,v)$ and the true class is unknown. Therefore, the information gain module 207 needs to estimate $\tilde{p}^{t+1}(o,v|x[ã^{t+1}])$ in a different way.

In some embodiments, the information gain module 207 computes individual expected information gains using $\tilde{p}^{t+1}(o,v|x[ã^{t+1}])$ for each set of values for $(õ,ṽ)$, and uses the weighted sum of the individual expected information gains to calculate the actual expected information gain for a particular action. In some embodiments, the information gain module 207 determines the weights to be proportional to the current state of belief $p^t(o,v|x^{0:t})$.

The active view planning algorithm can be summarized below. Assume that the current state of belief is $p^t(o, v|x^{0:t})$ at time instant time t. For a particular action $ã^{t+1}$, the normalization module 205 first shifts the current state of belief into the appropriate coordinate frame according to Equation 7, i.e., $p^{t+1}(o,v|x^{0:t}) = T_{ã^{t+1}}[p^t(o,v|x^{0:t})]$. The normalization module 205 then computes, for each class label $(õ,ṽ)$, the accumulated predicted distribution $\tilde{p}^{t+1}(o,v|x[ã^{t+1}])$ accounting for both the past measurements and the new predicted measurement using Equation 8, i.e., $$\tilde{p}^{t+1}(o, v | x^{0:t}, x[ã^{t+1}]) = \frac{1}{Z} \tilde{p}^{t+1}(o, v | x[ã^{t+1}]) p^{t+1}(o, v | x^{0:t}),$$

where $\tilde{p}^{t+1}(o,v|x[ã^{t+1}]) = Q(o,v|õ,ṽ)$.

Responsive to receiving data from the normalization module 205, the information gain module 207 computes the information gain for the action $ã^{t+1}$ given $(õ,ṽ)$ using Equation 9, i.e., $$IG(ã^{t+1} | õ, ṽ) = \sum_{o \in O} \sum_{v \in V} \tilde{p}^{t+1}(o, v | x^{0:t}, x[ã^{t+1}]) \log \frac{\tilde{p}^{t+1}(o, v | x^{0:t}, x[ã^{t+1}])}{p^{t+1}(o, v | x^{0:t})}$$

Responsive to the information gain IG(.) for all class labels $(õ,ṽ)$ being determined, the information gain module 207 computes the expected information gain with the expectation being taken with respect to the current state of belief $p^{t+1}(o,v|x^{0:t})$ as in Equation 11.

$$E[IG(ã^{t+1})] = \sum_{õ \in O} \sum_{ṽ \in V} p^{t+1}(õ, ṽ | x^{0:t}) IG(ã^{t+1} | õ, ṽ) \quad \text{(Equation 11)}$$

Using Equation 11, the information gain module 207 computes all actual expected information gains for all potential actions. In some embodiments, the information gain module 207 transmits the expected information gains to the action module 209 for further processing.

The action module 209 may include software and/or logic to provide the functionality for identifying an action to be taken by a mobile vision device 120 at time t and performing the action. The action details a movement (e.g., location, viewpoint, etc.) of the mobile vision device 120 and acquires image measurement at time t+1.

In some embodiments, the action module 209 receives, from the information gain module 207, actual expected information gains computed for potential actions that the mobile vision device 120 may take, and identifies a next action from the potential actions that the mobile vision device 120 should take based on the expected information gains. To increase the recognition accuracy, the action module 209 selects the action that results in a high information gain. Thus, if a first action results in an information gain that is greater than that of a second action, the action module 209 would identify the first action rather than the second action as a next action to be taken by the mobile vision device 120.

In some embodiments, the action module 209 identifies the "best" action, i.e., the action that achieves the largest information gain, as a next action to be taken. This action is best in the sense that performing the action would lead to a largest reduction in uncertainty of the recognition result or the largest increase of recognition accuracy as compared to other possible actions. As written in a mathematical expression of Equation 12, the action module 209 identifies the value $ã^{t+1}$ corresponding to the largest expected information gain as the next action taken by the mobile vision device 120.

$$a^{t+1} = \arg\max_{ã^{t+1} \in A} E[IG(ã^{t+1})] \quad \text{(Equation 12)}$$

For example, a drone can take three possible actions a1, a2 and a3 to go right, left and middle, respectively. If action a2 corresponds to the largest information gain, the action module 209 would choose action a2 such that the drone would move to the left from the current location and take an image on the left side with a largest recognition accuracy increase.

In other embodiments, the action module 209 identifies an action that achieves an information gain that satisfies a criterion. The criterion includes whether the information gain is above a predetermined threshold, whether the information gain is within a threshold range, etc. For example, if taking an action a1 by a drone means an information gain of 0.19 bits and the predetermined threshold is 0.15 bits, the action module 209 identifies a1 as the next action of the drone.

In some embodiments, in addition to the expected information gains, the action module 209 also add some other constraints to identify an action. For example, the action module 209 adds a path constraint, and identifies an action that maximizes the expected information gain and optimizes the path to the location specified by the action at the same time. So the mobile vision device 120 not only knows which location to go but also knows how to go to the location.

In some embodiments, the action module 209 receives, from the normalization module 205, an accumulated probability indicating a degree of certainty of an object and a viewpoint in an image, and determines whether a next action is needed for the mobile vision device 120 based on the accumulated probability. Here, the accumulated probability is $p^t(o,v|x^{0:t})$ that is computed by the normalization module 205 based on the image and previous images (i.e., all acquired information up to time t) using Equation 8. The next action is identified by the action module 209 based on the expected information gains, such as $\tilde{a}^{t+1}$ in Equation 12. The action module 209 determines whether to take a next action based on determining whether the accumulated probability $p^t(o,v|x^{0:t})$ satisfies a predefined criterion, for example, a predefined threshold, a threshold range. If the predefined criterion is not met, the action module 209 determines that the next action is needed. If the predefined criterion is met, the action module 209 determines not to take the next action. Continuing with the above example, if the action module 209 determines that the probability of recognition $p^t(o,v|x^{0:t})$ of the image taken at the current location at current time t is within a threshold range between 86% and 95%, the action module 209 would consider that the recognition accuracy is good enough and no extra recognition of an additional image is needed. The action module 209 determines that a next action at time t+1 is unnecessary even if knowing the action a2 is the best. In practice, the action module 209 determines whether a next action is needed before actually identifying the next action in order to save the computation time and increase the efficiency.

Once an action is identified, the action module 209 performs this action if the action module 209 is resided on the mobile vision device 120 such as a drone, a robot, etc. For example, if the identified action is to move a drone to viewpoint partition 3 as shown in FIG. 5 to take an image, the action module 209 translates the viewpoint partition information to the actual location and viewpoint coordinates based on the current location and viewpoint coordinates of the drone, and sends a command to a router of the drone to move the drone to the right location and take the image. When the identified action additionally includes path information, the action module 209 directs the router of the drone to follow a certain path to go to the right location.

To illustrate the active view planning method, pseudo-code and an example are described below. The pseudo-code includes the entire active view planning process after individual probabilities of recognition have been outputted by the image processing module (CNN) 204. Also the pseudo-code reflects the case of determining the best action that maximizes the expected information gain. The active view planning method will be described in detail with reference to FIGS. 11A and 11B.

Active View Planning pseudo-code

// for all potential actions
for $\tilde{a}^{t+1} \in A$ do
  // shift current belief
  $p^{t+1}(o,v|x^{0:t}) = T_{\tilde{a}^{t+1}}[p^t(o,v|x^{0:t})]$
  // for all object and viewpoint combinations
  for $\tilde{o} \in O, \tilde{v} \in V$ do
    // expected CNN distribution output
    $\tilde{p}^{t+1}(o,v|x[\tilde{a}^{t+1}]) = Q(o,v|\tilde{o},\tilde{v})$
    // combine past and precited distributions
    $\tilde{p}^{t+1}(o, v | x^{0:t}, x[\tilde{a}^{t+1}]) = \frac{1}{Z} \tilde{p}^{t+1}(o,v|x[\tilde{a}^{t+1}]) p^{t+1}(o, v | x^{0:t})$
    // calculate information gain
    $IG(\tilde{a}^{t+1} | \tilde{o}, \tilde{v}) = \sum_{O \in O} \sum_{v \in V} \tilde{p}^{t+1}(o, v | x^{0:t}, x[\tilde{a}^{t+1}])$
    $\log \frac{\tilde{p}^{t+1}(o, v | x^{0:t}, x[\tilde{a}^{t+1}])}{p^{t+1}(o, v | x^{0:t})}$
  end
  // calculate expected information gain
  $E[IG(\tilde{a}^{t+1})] = \sum_{\tilde{o} \in O} \sum_{\tilde{v} \in V} p^{t+1}(\tilde{o}, \tilde{v} | x^{0:t}) IG(\tilde{a}^{t+1} | \tilde{o}, \tilde{v})$
end
// choose next best action
$a^{t+1} = \arg \max_{\tilde{a}^{t+1} \in A} E[IG(\tilde{a}^{t+1})]$ One application of the active view planning method of the present specification is to tell a mobile vision device 120 such as a drone how to navigate through a scene to recognize an object and a viewpoint. The drone is activated to fly through the aisles of a store for capturing images of products on shelves of the store and recognizing the products and viewpoints of the products. This drone includes a camera for capturing images, and an active view planning application 103b to implement the functionality of recognizing the products and the viewpoints. The active view planning application 103b includes modules 204-209. The image processing module 204 (CNN) 204 performs object recognition on an image captured by the camera of the drone at a current position with a current viewpoint based on receiving position and orientation information of the drone. The normalization module 205 communicates with the image processing module (CNN) 204 to generate a probability as the recognition result based on this current image and any previous images of the product taken by the drone. The probability indicates a degree of certainty about the image including a product and was taken from a viewpoint. For example, it is determined that an image taken at 2:05 pm has 75% chance to be a shampoo bottle of brand X seen from 60 degree. If no image was taken before 2:05 pm, this 75% probability is computed by the image processing module (CNN) 204 based on this image alone. If one or more images of this bottle have been taken before 2:05 pm, this 75% probability is computed by the normalization module 205 and the image processing module (CNN) 204 based on information of all images acquired till 2:05 pm.

The action module 209 receives this probability and determines whether the probability exceeds a predetermined threshold (e.g., 90%). If the probability is less than the predetermined threshold (e.g., 75%<90%), the action module 209 identifies an action that directs the drone to move to a new position and take a new image at the new position with a new viewpoint. In some embodiments, the information gain module 207 computes expected gains of the information for a set of actions and the action module 209 identifies the action based on the expected gains. For example, the information gain module 207 computes that the expected gain to be 0.1 bits if the drone goes right, the expected gain to be 0.20 bits if the drone goes left, and the expected to be 0.15 bits if the drone goes in the middle. The action module 209 may determine that the drone should go right because it is the action with largest information gain (e.g., 0.20 bits). The drone takes a new image of the shampoo bottle after going to the right. If the probability of this new image is greater than the predetermined threshold, the action module 209 determines that the drone can stop taking images and stores the recognition result. The recognition result shows the product and the viewpoint recognized from the image and a probability of how accurate this recognition is.

The active view planning method of the present specification has many other applications. For example, in the case when the mobile vision device 120 is a medical scope such as an otoscope, the active view planning application 103a/103bb can tell a medical professional navigating the scope how to orient and move the scope in order to obtain the best recognition of a medical condition, e.g., the active view planning application 103a/103b may guide the medical professional to move the otoscope to the viewpoint from which the condition of the tympanic membrane (ear drum) is best classified into Acute Otitis Media, Otitis Media with Effusion and No Effusion. In another example, the mobile vision device 120 can be used to capture images of products on shelves. The active view planning application 103a/103b signals the mobile vision device 120 where and how to go to a location to take a product image such that the image is good in the sense that at least one product and a viewpoint can be recognized with a probability of recognition that satisfies a predefined criterion. While the examples herein describe recognition of products in an image of shelves, such as a retail display, it should be understood that the image may include any arrangement of one or more objects or items. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

Figure 8:
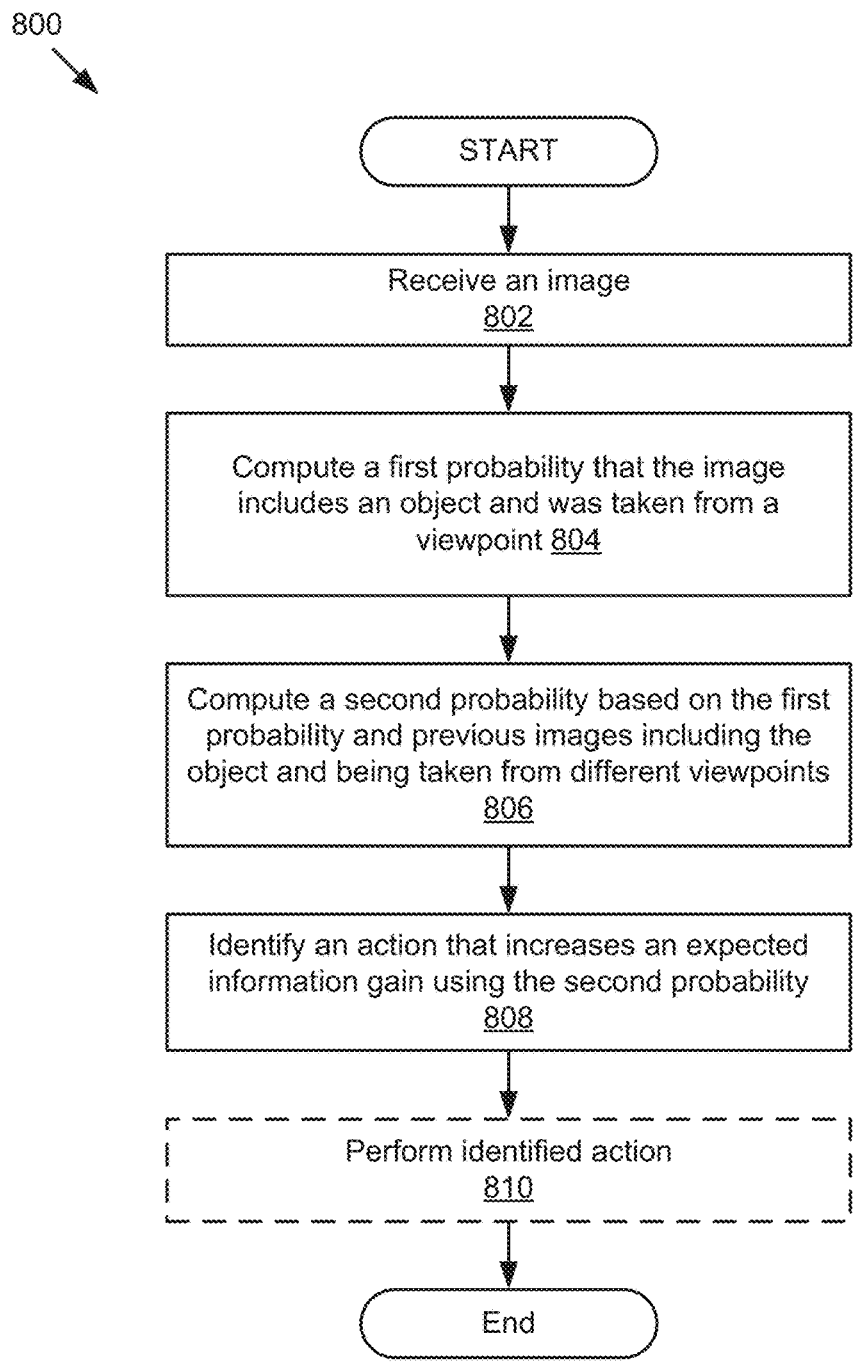
FIG. 8 depicts a flow diagram illustrating a first embodiment of a method for identifying an object and a viewpoint from an image with a probability that satisfies a predefined criterion based on deep network learning, followed by identifying an action by the mobile vision system.

FIG. 8 depicts a flow diagram illustrating a first embodiment of a method 800 for identifying an object and a viewpoint from an image with a probability that satisfies a predefined criterion based on deep network learning. At 802, the image processing module (CNN) 204 receives an image. In some embodiments, the image processing module (CNN) 204 also receives location information associated with the image, for example, as a separate signal or metadata with the image. At 804, the image processing module (CNN) 204 computes a first probability that the image includes an object and was taken from a viewpoint using an image processing module (CNN) 204. At 806, responsive to receiving the first probability from the image processing module (CNN) 204, the normalization module 205 computes a second probability based on the first probability and previous images including the object and being taken from different viewpoints. The second probability indicates a current belief of a current image including the object and the viewpoint based on past images evaluated in previous actions and previous time instants. At 808, the action module 209 identifies an action that increases an expected information gain using the second probability. In some embodiments, the information gain module 207 computes the expected information gain based on the second probability. In some embodiments, the action module 209 identifies the action that achieves an expected information gain that is above a predetermined gain or threshold. In other embodiments, the action module 209 identifies the action that maximizes the expected information gain. At 810, the action module 209 performs the identified action if it is needed. In some embodiments, the step 810 is optional.

Figure 9:
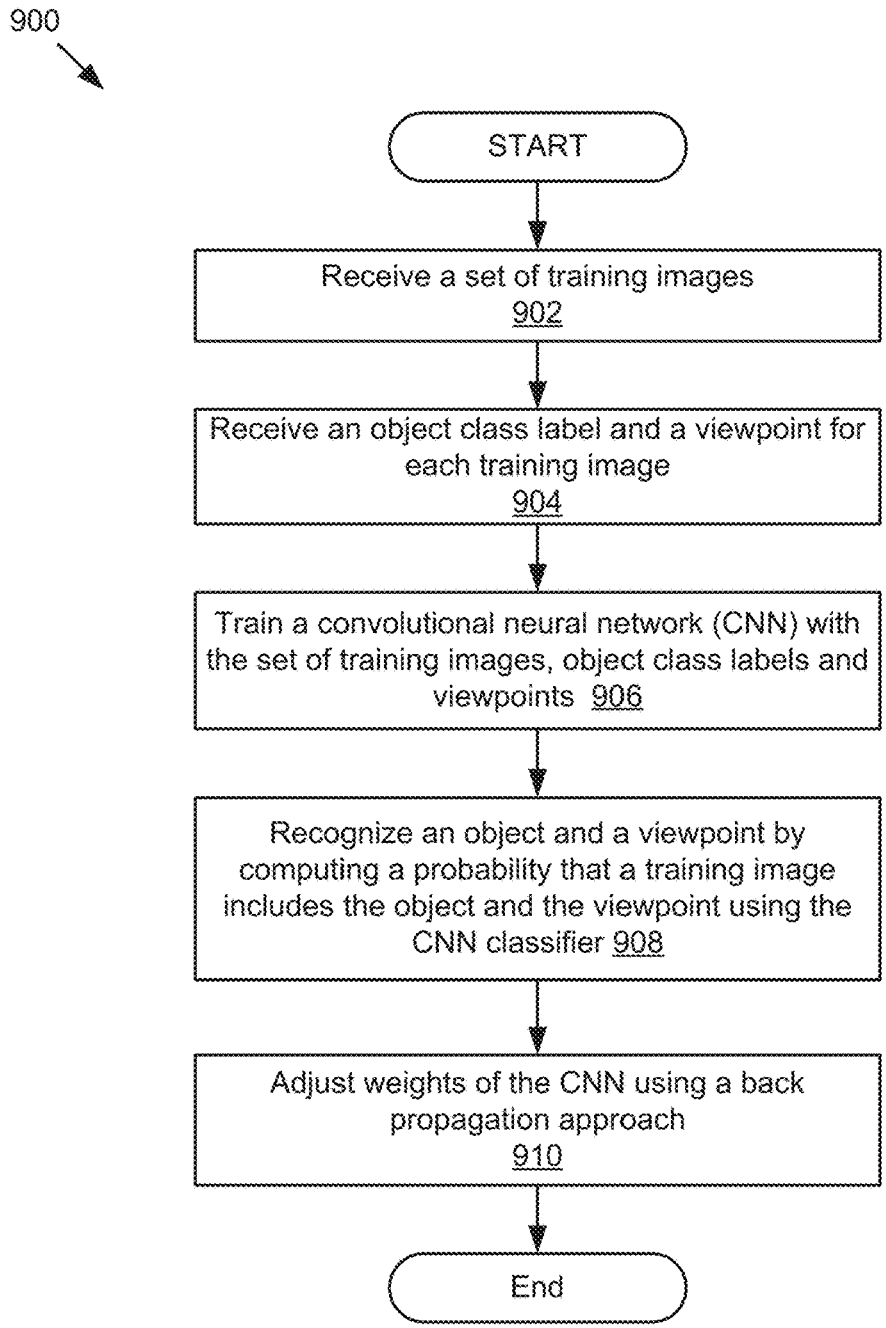
FIG. 9 depicts a flow diagram illustrating one embodiment of a method for training convolutional neural networks.

FIG. 9 depicts a flow diagram illustrating one embodiment of a method 900 for training convolutional neural networks. As described above, the active view planning module 103a residing on the recognition server 101 may include a training module 203 and an image processing module (CNN) 204. At 902, the training module 203 receives a set of training images. At 904, the training module 203 receives an object class label and a viewpoint for each training image. At 906, the training module 203 trains a convolution neural network (CNN) with the set of training images, object class labels and viewpoints. At 908, the image processing module (CNN) 204 recognizes an object and a viewpoint by computing a probability that a training image includes the object and the viewpoint using the CNN classifier. At 910, the training module 203 communicates with the image processing module (CNN) 204 to adjust weights of the CNN using a back propagation approach.

Figure 10:
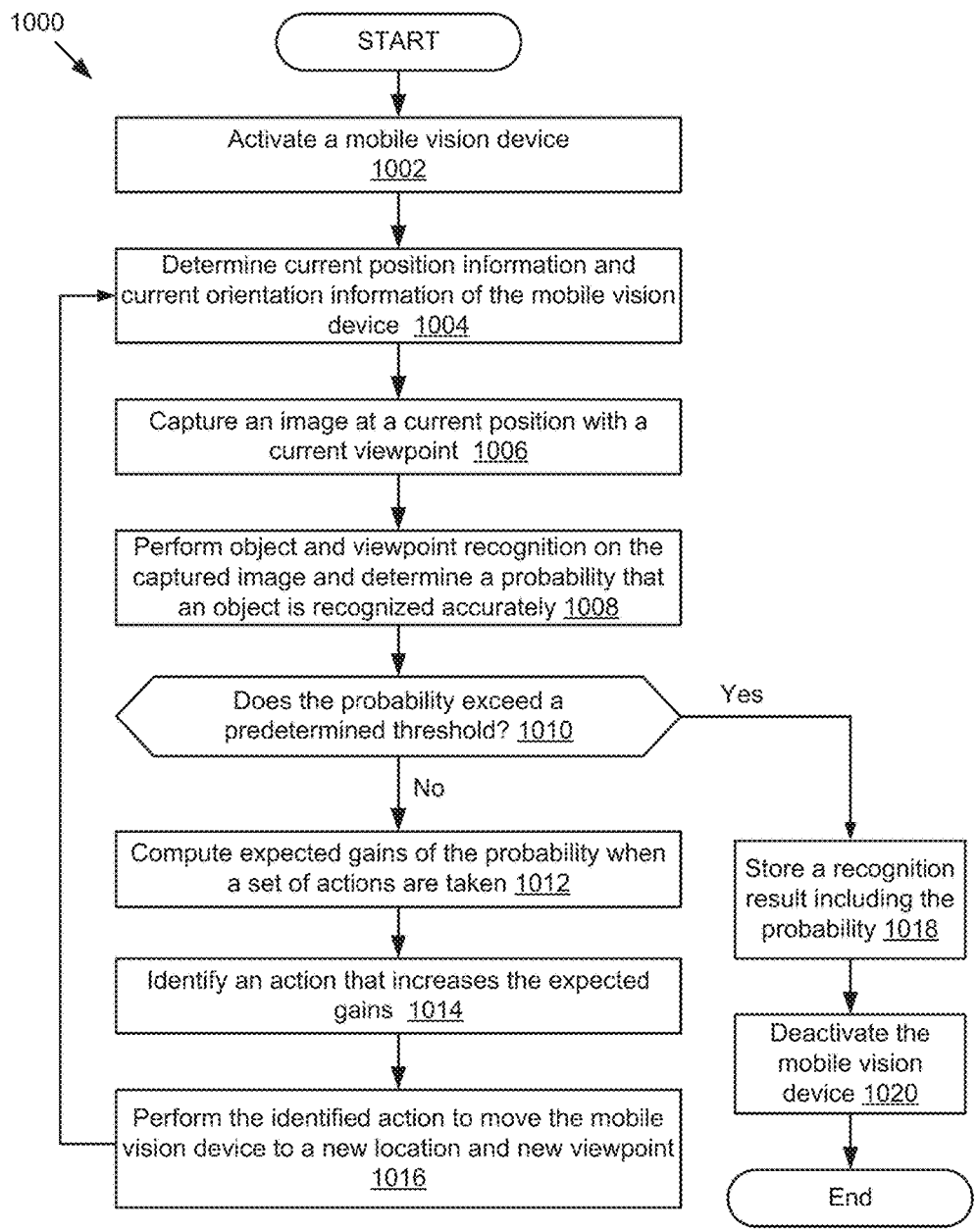
FIG. 10 depicts a flow diagram illustrating a second embodiment of the method for identifying an object and a viewpoint from an image with a probability that satisfies a predefined criterion based on deep network learning, followed by identifying and performing an action by the mobile vision system.

FIG. 10 depicts a flow diagram illustrating a second embodiment of the method 1000 for identifying an object and a viewpoint from an image with a probability that satisfies a predefined criterion based on deep network learning. At 1002, the mobile vision device 120 is activated. At 1004, the image processing module (CNN) 204 determines current position information and current orientation information of the mobile vision device 120. At 1006, the mobile vision device 120 uses a camera to capture an image at a current position with a current viewpoint. At 1008, the image processing module (CNN) 204 performs object recognition on the captured image and cooperates with the normalization module 205 to determine a probability that an object is recognized accurately. The process of determining the probability includes computing the probability that the captured image contains the object at a certain viewpoint, retrieves probabilities from previous measurements, and integrates all the probabilities to get an overall probability of accurate object and viewpoint recognition, i.e., the current belief. The normalization module 205 transmits the probability to the action module 209. At 1010, the action module 209 determines whether the probability exceeds a predetermined threshold. In some embodiments, the predetermined threshold is specified a value in a range, for example, between 85% and 100%. Responsive to determining that the probability does not exceed the predetermined threshold, at 1012, the information gain module 207 computes expected gains of the probability when a set of actions are taken. At 1014, the action module 209 identifies an action that increases the expected gains. At 1016, the action module 209 performs the identified action to move the mobile vision device 120 to a new location and new viewpoint. The method 1000 goes back to step 1004. Responsive to determining that the probability exceeds the predetermined threshold, at 1018, the action module 209 stores a recognition result including the probability, and at 1020, the action module 209 deactivates the mobile vision device 120.

Figure 11A:
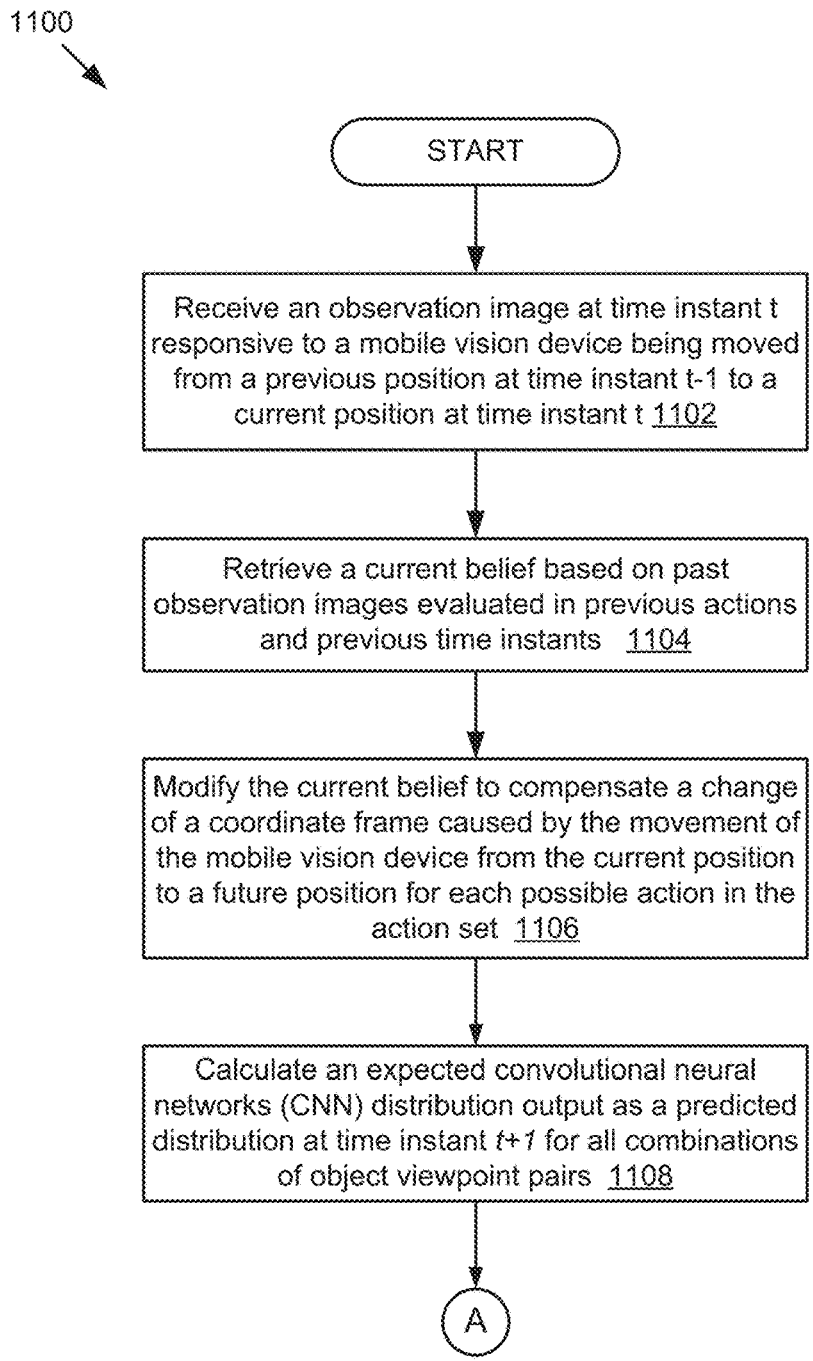
FIGS. 11A and 11B depict a flow diagram illustrating a third embodiment of the method for identifying an object and a viewpoint from an image with a probability that satisfies a predefined criterion based on deep network learning, followed by identifying an action to be performed by the mobile vision system.
Figure 11B:
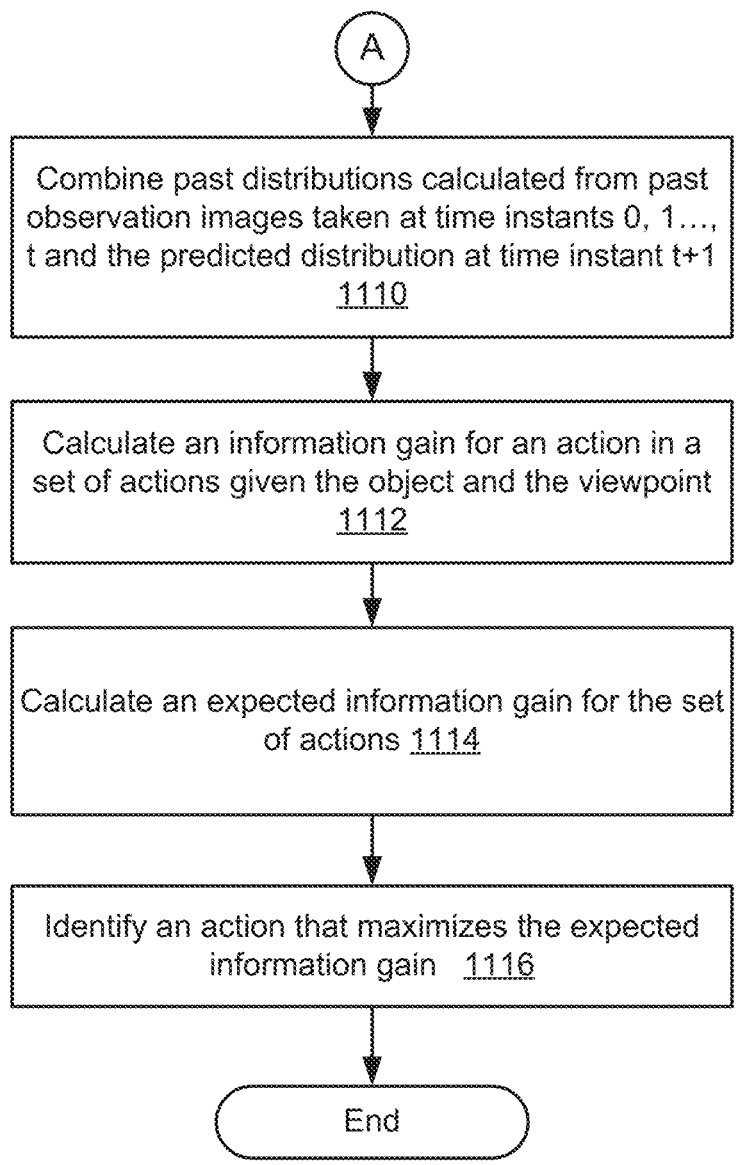

FIGS. 11A and 11B depict a flow diagram illustrating a third embodiment of the method 1100 for identifying an object and a viewpoint from an image with a probability that satisfies a predefined criterion based on deep network learning. The method 1100 is based on the pseudo code described above. In FIG. 11A, at 1102, the image processing module (CNN) 204 receives an observation image at time instant t responsive to a mobile vision device 120 being moved from a previous position at time instant t−1 to a current position at time instant t. At 1104, the image processing module (CNN) 204 retrieves a current belief based on past observation images evaluated in previous actions and previous time instants. At 1106, the normalization module 205 modifies the current belief to compensate a change of a coordinate frame caused by the movement of the mobile vision device 120 from the current position to the future position for each possible action in the action set. At 1108, the normalization module 205 calculates an expected convolutional neural networks (CNN) distribution output as a predicted distribution at time instant t+1 for all combinations of object, viewpoint pairs.

Referring now to FIG. 11B, at 1110, the normalization module 205 combines past CNN distributions calculated from past observation images taken at time instants 0, 1 . . . , t and the predicted distribution at time instant t+1. At 1112, the information gain module 207 calculates an information gain for an action in a set of actions given the object and the viewpoint. At 1114, the information gain module 207 calculates an expected information gain for the set of actions. At 1116, the action module 209 identifies an action that maximizes the expected information gain.

A system and method for identifying an object and a viewpoint from an image with a probability that satisfies a predefined criterion based on deep network learning has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic mobile vision device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    receiving, by a computing device, a first image;
    performing, by the computing device, recognition on the first image using a deep neural network;
    determining, by the computing device, a probability of recognition for an object based on performing the recognition on the first image, the probability of recognition for the object identifying an extent of certainty about the image including the object and being captured at a first viewpoint;
    determining, by the computing device, whether the probability of recognition for the object satisfies a predetermined threshold;
    responsive to determining that the probability of recognition for the object does not satisfy the predetermined threshold, determining, by the computing device, a first expected gain in the probability of recognition when a first action is taken and a second expected gain in the probability of recognition when a second action is taken, the first action and the second action belonging to a set of actions describing receiving a second image for increasing the probability of recognition; and
    identifying a next action from the first action and the second action based on an increase in expected gains.

2. The computer-implemented method of claim 1, further comprising performing the next action.

3. The computer-implemented method of claim 1, further comprising:
    responsive to determining that the probability of recognition for the object satisfies the predetermined threshold, foregoing the next action.

4. The computer-implemented method of claim 1, wherein the deep neural network is a convolutional neural network.

5. The computer-implemented method of claim 1, wherein the deep neural network determines a class label having an object label and a viewpoint label.

6. The computer-implemented method of claim 1, further comprising:
    receiving a set of training data including an original dataset of object images and viewpoints and an augmented dataset of images with ambiguous viewpoints; and
    training the deep neural network to recognize the object and the viewpoint from the first image using the set of training data.

7. The computer-implemented method of claim 1, wherein identifying the next action includes:
    determining a current belief based on past images evaluated in previous actions and previous time instants;
    combining past distributions calculated from the past images and a predicted distribution; and
    determining an expected information gain based on the combined distributions.

8. The computer-implemented method of claim 7, further comprising modifying the current belief to compensate a change of a coordinate frame.

9. A system comprising:
    one or more processors; and
    a memory, the memory storing instructions, which when executed cause the one or more
    processors to:
    receive a first image;
    perform recognition on the first image using a deep neural network;
    determine a probability of recognition for an object based on performing the recognition on the first image, the probability of recognition for the object identifying an extent of certainty about the image including the object and being captured at a first viewpoint;
    determine whether the probability of recognition for the object satisfies a predetermined threshold;
    responsive to determining that the probability of recognition for the object does not satisfy the predetermined threshold, determine a first expected gain in the probability of recognition when a first action is taken and a second expected gain in the probability of recognition when a second action is taken, the first action and the second action belonging to a set of actions describing receiving a second image for increasing the probability of recognition; and
    identify a next action from the first action and the second action based on an increase in expected gains.

10. The system of claim 9, wherein the instructions cause the one or more processors to send a command to perform the next action.

11. The system of claim 9, wherein the instructions cause the one or more processors to:

responsive to determining that the probability of recognition for the object satisfies the predetermined threshold, a command to forego the next action is sent.

12. The system of claim 9, wherein the deep neural network is a convolutional neural network.

13. The system of claim 9, wherein the deep neural network determines a class label having an object label and a viewpoint label.

14. The system of claim 9, wherein the instructions cause the one or more processors to:
   receive a set of training data including an original dataset of object images and viewpoints and an augmented dataset of images with ambiguous viewpoints; and
   train the deep neural network to recognize the object and the viewpoint from the first image using the set of training data.

15. The system of claim 9, wherein to identify the next action, the instructions cause the one or more processors to:
   determine a current belief based on past images evaluated in previous actions and previous time instants;
   combine past distributions calculated from the past images and a predicted distribution; and
   determine an expected information gain based on the combined distributions.

16. The system of claim 15, wherein the instructions cause the one or more processors to modify the current belief to compensate a change of a coordinate frame.

17. A computer program product comprising a non-transitory computer readable medium storing a computer readable program, wherein the computer readable program when executed causes a computer to:
   receive a first image;
   perform recognition on the first image using a deep neural network;
   determine a probability of recognition for an object based on performing the recognition on the first image, the probability of recognition for the object identifying an extent of certainty about the image including the object and being captured at a first viewpoint;
   determine whether the probability of recognition for the object satisfies a predetermined threshold;
   responsive to determining that the probability of recognition for the object does not satisfy the predetermined threshold, determine a first expected gain in the probability of recognition when a first action is taken and a second expected gain in the probability of recognition when a second action is taken, the first action and the second action belonging to a set of actions describing receiving a second image for increasing the probability of recognition; and
   identify a next action from the first action and the second action based on an increase in expected gains.

18. The computer program product of claim 17, wherein the computer readable program causes the computer to perform the next action.

19. The computer program product of claim 17, wherein the computer readable program causes the computer to:
   responsive to determining that the probability of recognition the for the object satisfies predetermined threshold, foregoing the next action.

20. The computer program product of claim 17, wherein the deep neural network is a convolutional neural network.

* * * * *

UNITED STATES PATENT AND TRADEMARK OFFICE
CERTIFICATE OF CORRECTION

PATENT NO. : 10,083,369 B2
APPLICATION NO. : 15/201089
DATED : September 25, 2018
INVENTOR(S) : Ivana Tosic et al.

Page 1 of 1

It is certified that error appears in the above-identified patent and that said Letters Patent is hereby corrected as shown below:

In the Claims

In Column 28, Line 26, please replace "probability of recognition the for the object" with
– probability of recognition for the object –

Signed and Sealed this
Seventeenth Day of March, 2020

Andrei Iancu
*Director of the United States Patent and Trademark Office*